US010022791B2

(12) United States Patent
Patel et al.

(10) Patent No.: US 10,022,791 B2
(45) Date of Patent: *Jul. 17, 2018

(54) METHOD FOR SYNTHESIZING SELF-ASSEMBLING NANOPARTICLES

(71) Applicant: University of Louisville Research Foundation, Inc., Louisville, KY (US)

(72) Inventors: Dhruvinkumar Patel, Louisville, KY (US); Kurtis James, Louisville, KY (US); Martin G. O'Toole, Louisville, KY (US); Robert S. Keynton, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/941,055

(22) Filed: Nov. 13, 2015

(65) Prior Publication Data

US 2016/0067777 A1 Mar. 10, 2016

Related U.S. Application Data

(63) Continuation-in-part of application No. 13/895,102, filed on May 15, 2013, now Pat. No. 9,266,172.

(60) Provisional application No. 62/079,869, filed on Nov. 14, 2014, provisional application No. 61/647,586, filed on May 16, 2012.

(51) Int. Cl.
*B22F 9/24* (2006.01)
*C01G 7/00* (2006.01)
*B22F 1/00* (2006.01)

(52) U.S. Cl.
CPC .............. *B22F 1/0018* (2013.01); *B22F 9/24* (2013.01); *C01G 7/00* (2013.01); *B22F 2301/255* (2013.01); *B22F 2304/05* (2013.01); *C01P 2002/82* (2013.01); *C01P 2004/03* (2013.01); *C01P 2004/04* (2013.01); *C01P 2004/32* (2013.01)

(58) Field of Classification Search
None
See application file for complete search history.

(56) References Cited

U.S. PATENT DOCUMENTS

| | | | |
|---|---|---|---|
| 9,266,172 B2 * | 2/2016 | Gobin | B22F 9/16 |
| 9,772,290 B2 * | 9/2017 | Hossain | G01N 21/658 |
| 2008/0093550 A1 * | 4/2008 | Hong | B82Y 15/00 |
| | | | 250/310 |
| 2008/0166706 A1 | 7/2008 | Zhang et al. | |
| 2010/0152077 A1 | 6/2010 | Allston et al. | |

(Continued)

OTHER PUBLICATIONS

Junhui He, et al., Facile In Situ Synthesis of Noble Metal Nanoparticles in Porous Cellulose Fibers, Chem. Mater. 2003, 15, 4401-4406.

*Primary Examiner* — George P Wyszomierski
(74) *Attorney, Agent, or Firm* — Bingham Greenebaum Doll LLP; Brian W. Chellgren; James C Eaves, Jr.

(57) ABSTRACT

Embodiments disclosed herein relate to a method for synthesizing self-assembling nanoparticles with defined plasmon resonances. More particularly, certain embodiments disclosed herein relate to an improved method for synthesizing self-assembling gold nanoparticles by dialyzing samples during the self-assembly process or in presence of a surface to reduce certain subpopulations.

21 Claims, 27 Drawing Sheets

(56) References Cited

U.S. PATENT DOCUMENTS

2011/0064665 A1    3/2011   Gobin et al.
2011/0064676 A1    3/2011   Gobin et al.

\* cited by examiner

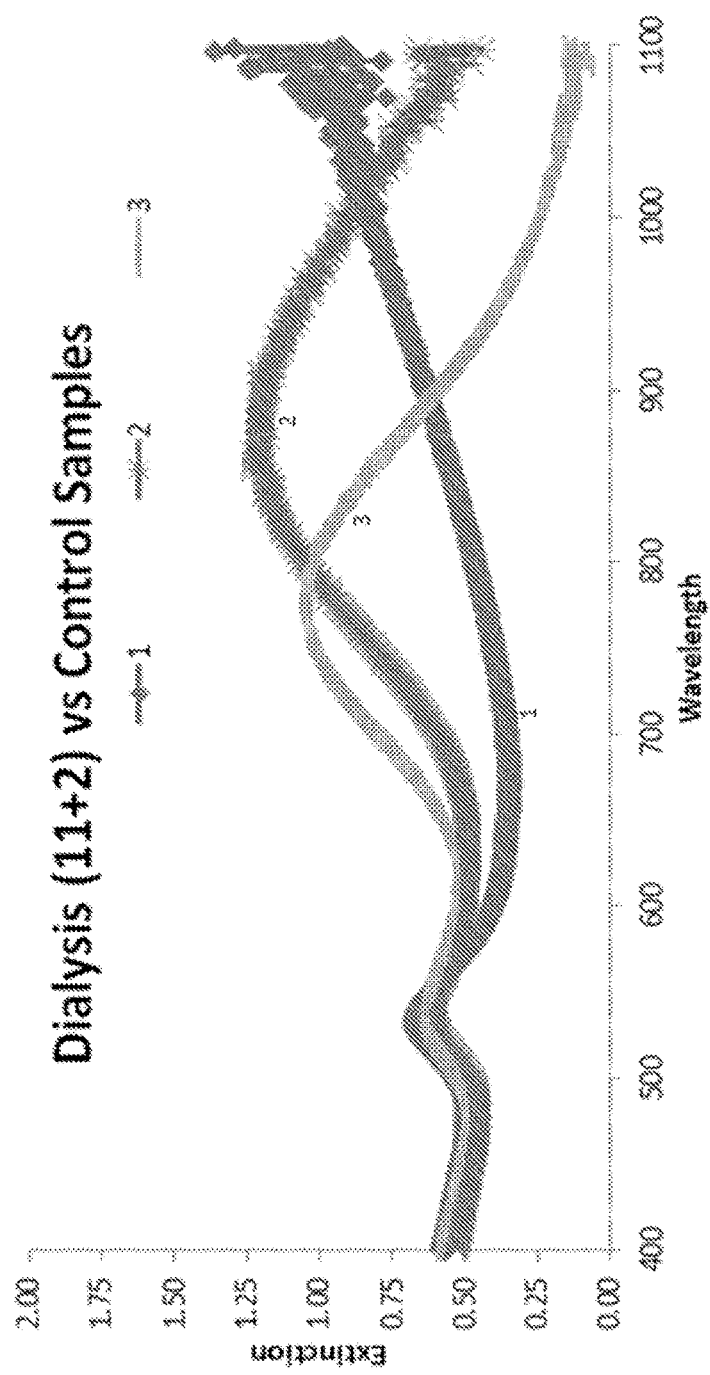

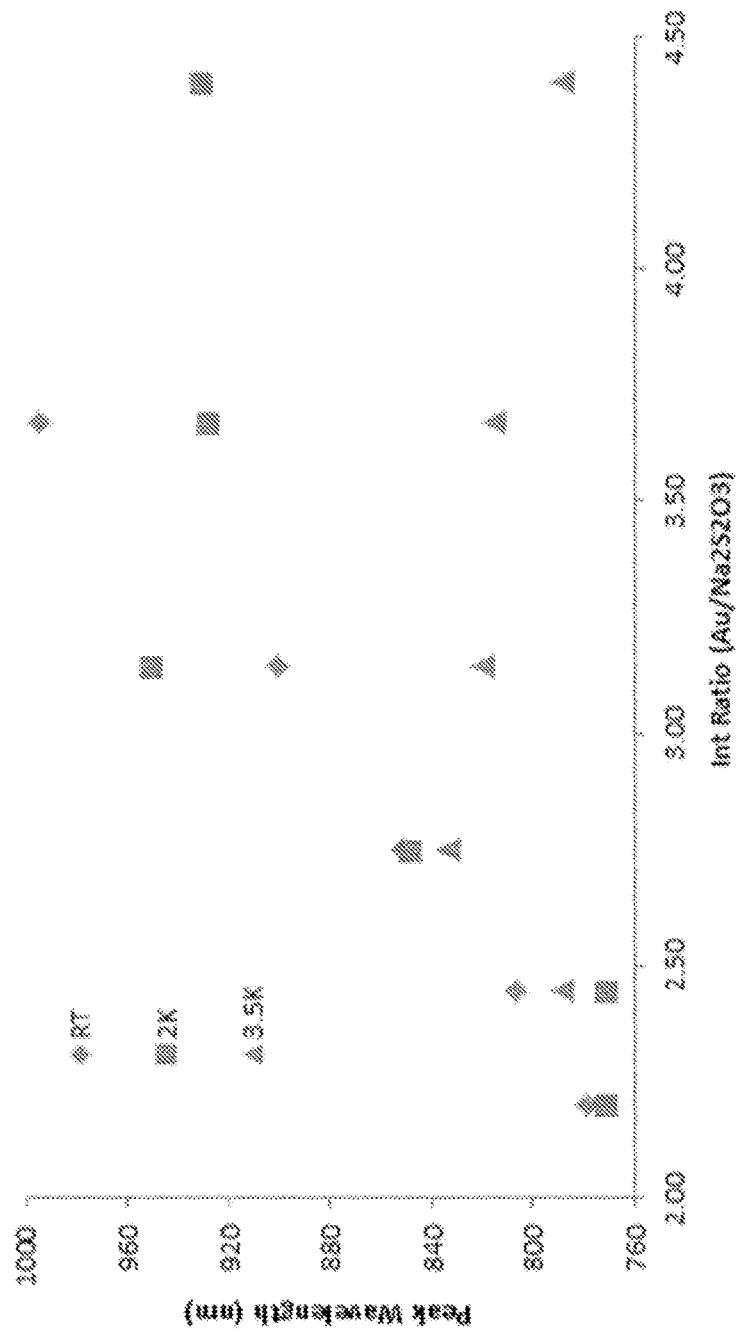

METHOD FOR SYNTHESIZING SELF-ASSEMBLING NANOPARTICLES

CROSS-REFERENCE TO RELATED APPLICATION

This application claims the benefit of priority to U.S. Provisional Patent Application Ser. No. 62/079,869, filed Nov. 14, 2014, entitled METHOD FOR SYNTHESIZING SELF-ASSEMBLING NANOPARTICLES, incorporated herein by reference. This application further claims the benefit of priority as a continuation-in-part to U.S. patent application Ser. No. 13/895,102, filed May 15, 2013, entitled METHOD FOR SYNTHESIZING SELF-ASSEMBLING NANOPARTICLES, which claims the benefit of priority to U.S. Provisional Patent Application Ser. No. 61/647,586, filed May 16, 2012, entitled METHOD FOR SYNTHESIZING SELF-ASSEMBLING NANOPARTICLES, both of which are incorporated herein by reference.

FIELD

Embodiments disclosed herein relate to a method for synthesizing self-assembling nanoparticles with defined plasmon resonances. Embodiments disclosed herein relate to the term "gold nanoparticles", which is a broad term used for gold nanoplates, gold nanorods, or gold nanospheres. More particularly, certain embodiments disclosed herein relate to an improved method for synthesizing self-assembling gold nanoparticles by dialyzing samples during the self-assembly process or in presence of a surface able to selectively adsorb certain subpopulations of nanoparticles within a mixture to effectively reduce the concentration of said subpopulations in the final product mixture.

BACKGROUND

U.S. application Ser. Nos. 12/807,792 and 12/807,793 (the "'792 and '793 applications"), incorporated herein by reference in their entireties, disclosed gold/gold sulfide ("GGS") nanoparticles within a chitosan matrix, and methods for synthesizing and using the same. These references disclose forming gold nanoparticles by self-assembly of a sulfide source, such as sodium thiosulfate, and a gold source, such as chloroauric acid. Gold nanoparticles have absorbance peaks in the near infra-red ("NIR") region, which are tunable by varying the self-assembly conditions, and in the visible region (~530 nm). During self-assembly of gold nanoparticles, gold colloid is simultaneously formed as a byproduct. In the '792 and '793 applications, gold colloid particles were removed using one, or more commonly three, rounds of centrifugation.

SUMMARY

Embodiments disclosed herein relate to methods for synthesizing self-assembling nanoparticles. More particularly, certain embodiments disclosed herein relate to an improved method for synthesizing self-assembling gold nanoparticles by dialyzing samples during the self-assembly process. A "quality ratio" is defined herein as the ratio of the absorbance of synthesized particles in the NIR region (600 nm to 2000 nm, for the purposes of this calculation), which corresponds to absorbance characteristics of gold nanoparticles, relative to absorbance at 530+/−20 nm, which corresponds to the absorbance characteristics of gold colloid. In some embodiments, the methods for synthesizing gold nanoparticles disclosed herein provides a higher quality ratio as compared to the methods cited in the '792 and '793 applications.

In some embodiments, the present invention pertains to a method for making nanoparticles, including combining a gold source and a sulfide source in a first chamber, the first chamber being separated from a second chamber by a semipermeable membrane, wherein the gold source and sulfide source self-assemble into nanoparticles. In further embodiments, the nanoparticles comprise gold and/or gold sulfide.

In further embodiments, the gold source is a gold salt, such as, for example, chloroauric acid, sodium tetrachloroaureate(III) dehydrate, or a mixture thereof. In certain embodiments, the sulfur source is a sulfide salt, such as, for example, sodium thiosulfate, sodium sulfide, sodium hydrosulfide, sodium sulfate, or a mixture thereof.

In some embodiments, the combining occurs at a predetermined temperature or within a predetermined range of temperatures. In certain embodiments, the predetermined temperature is room temperature. In other embodiments, the predetermined temperature is above or below room temperature. In further embodiments, the temperature is about 100° C. In some embodiments, the nanoparticles have an absorbance peak between 600 nm and 2000 nm.

In further embodiments, the nanoparticles have a tunable absorbance peak. In some embodiments, the method includes tuning the absorbance peak by adjusting the ratio of gold source and sulfide source. In further embodiments, the semipermeable membrane has a molecular weight cutoff ("MWCO") and the method includes tuning the absorbance peak by selecting the MWCO of the semipermeable membrane. In certain embodiments, the MWCO is between about 2 KDa and 50 KDa, between about 2 KDa and about 12 KDa, or about 12 KDa. In some embodiments, the semipermeable membrane has a surface area, the gold source and sulfide source have a combined volume, and the method includes tuning the absorbance peak by adjusting a ratio of the surface area of membrane to the combined volume. In certain embodiments, the ratio of the surface area of membrane is higher or lower than the combined volume. In further embodiments, the combining has duration, and the method includes tuning the absorbance peak by adjusting the duration of the combining step. In certain embodiments, the method includes tuning the absorbance peak by adjusting the temperature.

In some embodiments, the nanoparticles have a quality ratio greater than 1.8, greater than 2.0, or greater than 2.3, without centrifugation of the nanoparticles.

In some embodiments, the present invention pertains to a method for making nanoparticles including adding a first chemical species to a first chamber, and adding a second chemical species to a second chamber, the first chamber being separated from a second chamber by a semipermeable membrane having a MWCO, wherein the first chemical species and second chemical species self-assemble into nanoparticles. In further embodiments, the first chemical species is a gold source and the second chemical species is a sulfide source.

In some embodiments, the present invention pertains to a method for self-assembly of nanoparticles including separating a first chamber from a second chamber using a semipermeable membrane, adding a gold source and a sulfide source to the first chamber, and adding water to the second chamber, whereby production of gold nanoparticles is favored in the first chamber.

In some embodiments, the semipermeable membrane is used with the combined gold source and a sulfide source where the semipermeable membrane does not separate the reaction mixture into two chambers, and the two solutions area combined in presence of a semipermeable membrane, whereby the production of gold nanoparticles is favored and/or colloidal gold particles preferentially adsorb to the semipermeable membrane.

In some embodiments, the present invention pertains to a method for making nanoparticles, the method comprising providing a chamber including an adsorptive surface, combining a gold source and a sulfide source in the chamber, wherein the gold source and sulfide source self-assemble into nanoparticles and gold colloid, and wherein one of the gold colloid and the nanoparticles is selectively adsorbed to the adsorptive surface.

In some embodiments, the nanoparticles comprise gold and gold sulfide. In further embodiments, the gold source is a gold salt. In further embodiments, the gold source is chloroauric acid, sodium tetrachloroaureate(III) dehydrate, or a mixture thereof. In some embodiments, the sulfide source is a sulfide salt. In further embodiments, the sulfide source is one of sodium thiosulfate, sodium sulfide, or a mixture thereof. In certain embodiments, the nanoparticles have an absorbance peak between 700 nm and 1100 nm. In some embodiments, the present invention further comprises controlling an absorbance peak of the nanoparticles by adjusting a ratio of gold source and sulfide source. In further embodiments, the adsorptive surface has a surface area and wherein the gold source and sulfide source have a combined volume, and further comprising controlling an absorbance peak of the nanoparticles by adjusting a ratio of the surface area to the combined volume. In certain embodiments, the combining occurs at a temperature, and further comprising controlling an absorbance peak of the nanoparticles by adjusting the temperature. In some embodiments, the combining occurs for a period of time, and further comprising controlling an absorbance peak of the nanoparticles by adjusting the period of time. In further embodiments, the gold colloid is selectively adsorbed to the adsorptive surface. In certain embodiments, the adsorptive surface is configured to permit movement of nanoparticles and gold colloid throughout the chamber without requiring passage through the adsorptive surface. In some embodiments, the adsorptive surface is configured to permit mixing of gold source, sulfide source, nanoparticles and gold colloid. In further embodiments, only one of the gold colloid and the nanoparticles is selectively adsorbed to the adsorptive surface. In certain embodiments, the adsorptive surface is a membrane. In some embodiments, the membrane is a cellulose acetate membrane.

In some embodiments, the present invention pertains to a method for self-assembly of nanoparticles, the method comprising providing a solution including a gold source and a sulfide source, providing an adsorptive surface, and placing the solution and the adsorptive surface in a chamber, wherein the gold source and the sulfide source self-assemble into nanoparticles and gold colloid, and wherein the gold colloid is selectively adsorbed to the adsorptive surface. In some embodiments, the nanoparticles have a tunable absorbance peak. In further embodiments, the adsorptive surface is configured within the chamber to permit mixing of gold source, sulfide source, nanoparticles and gold colloid.

In some embodiments, the present invention pertains to a method for removing gold colloid from nanoparticles, the method comprising combining a gold source, a sulfide source, and an adsorptive surface and separating the adsorptive surface from the gold source and from the sulfide source after a predetermined time period, wherein the gold source and the sulfide source self-assemble into nanoparticles and gold colloid, and wherein one of the gold colloid and the nanoparticles is selectively adsorbed to the adsorptive surface. In further embodiments, the adsorptive surface is a cellulose acetate membrane.

This summary is provided to introduce a selection of the concepts that are described in further detail in the detailed description and drawings contained herein. This summary is not intended to identify any primary or essential features of the claimed subject matter. Each embodiment described herein is not intended to address every object described herein, and each embodiment does not necessarily include each feature described. Other forms, embodiments, objects, advantages, benefits, features, and aspects of the present invention will become apparent to one of skill in the art from the detailed description and drawings contained herein.

BRIEF DESCRIPTION OF THE DRAWINGS

A better understanding of the present invention will be had upon reference to the following description in conjunction with the accompanying drawings, wherein:

FIGS. 5A-5B are spectral scans of samples from Example 3;

FIG. 13C is a chart showing the relationship between peak wavelength and initial ratio (defined in Example 11 below).

DETAILED DESCRIPTION OF THE PREFERRED EMBODIMENT

Figure 1:
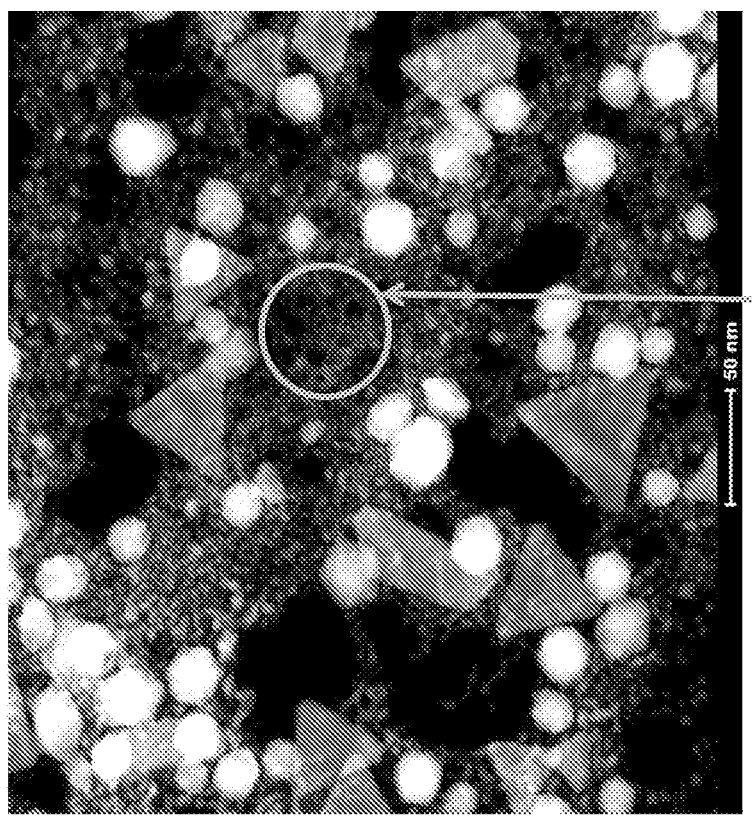
FIG. 1 is a Transmission Electron Microscope (TEM) image of a sample including gold nanoparticles and gold colloid.

For purposes of promoting an understanding of the principles of the invention, reference will now be made to one or more selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. One embodiment of the invention is shown in great detail, although it will be apparent to those skilled in the relevant art that some features or some combinations of features may not be shown for the sake of clarity.

Gold nanoparticles are preferably created by the self-assembly of a sulfide source and a gold source. In some embodiments, the sulfide source is a sulfide salt. In certain embodiments, the sulfide source is sodium thiosulfate ($Na_2S_2O_3$), sodium sulfide ($Na_2S$), or other suitable sulfur-containing chemical or mixture of chemicals. In some embodiments, the gold source is a gold salt. In some embodiments, the gold source is chloroauric acid ($HAuCl_4$), sodium tetrachloroaurate(III) dehydrate ($NaAuCl_4$), or other suitable gold-containing chemical or mixture of chemicals. The absorbance peak of gold nanoparticles can be controlled by one or more of (1) cooperatively adjusting the ratio of sodium thiosulfate and chloroauric acid solutions used to create the gold nanoparticles, (2) adjusting the concentration of sodium thiosulfate and chloroauric acid, (3) adjusting the temperature, (4) adjusting the physical state of the gold and sulfide solutions through (a) agitation, (b), premixing the solutions prior to dialysis, or (c) a combination of (a) and (b), (5) adjusting the molecular weight cut off of the semipermeable membrane used in dialysis or as a reaction vessel, (6) adjusting the dialysate used for the dialysis reaction, and (7) adjusting the ratio of surface area of the semipermeable membrane to the volume of the combined gold and sulfide sources within the membrane (8) adjusting the ratio of surface area of the semipermeable membrane to the combined volume of gold and sulfide sources. Using manufacturing methods disclosed herein, stable gold nanoparticles may be produced with absorbance peaks between about 600 nm-2000 nm and/or 530 nm gold colloid. In certain embodiments, where the gold nanoparticles are intended to be excited by a laser, the nanoparticles are selectively manufactured to have an absorbance peak substantially identical to the wavelength of the laser to maximize energy absorption.

Referring now to FIG. 1, gold colloid is a byproduct of gold nanoparticles self-assembly. Gold colloid has an absorbance peak at 530+/−20 nm. FIG. 1 shows a sample of gold nanoparticles with byproduct gold colloid produced by the single step assembly method disclosed in the '792 and '793 applications, prior to any separation steps. In the methods disclosed in the '792 and '793 applications, gold nanoparticles are separated from gold colloid by centrifugation. An example separation process is centrifugation at 1000 g for 20 minutes. Additional centrifugation steps may be used to increase purity. While effective in separating gold colloid from gold nanoparticles, centrifugation decreases the gold nanoparticles' yield.

Figure 2:
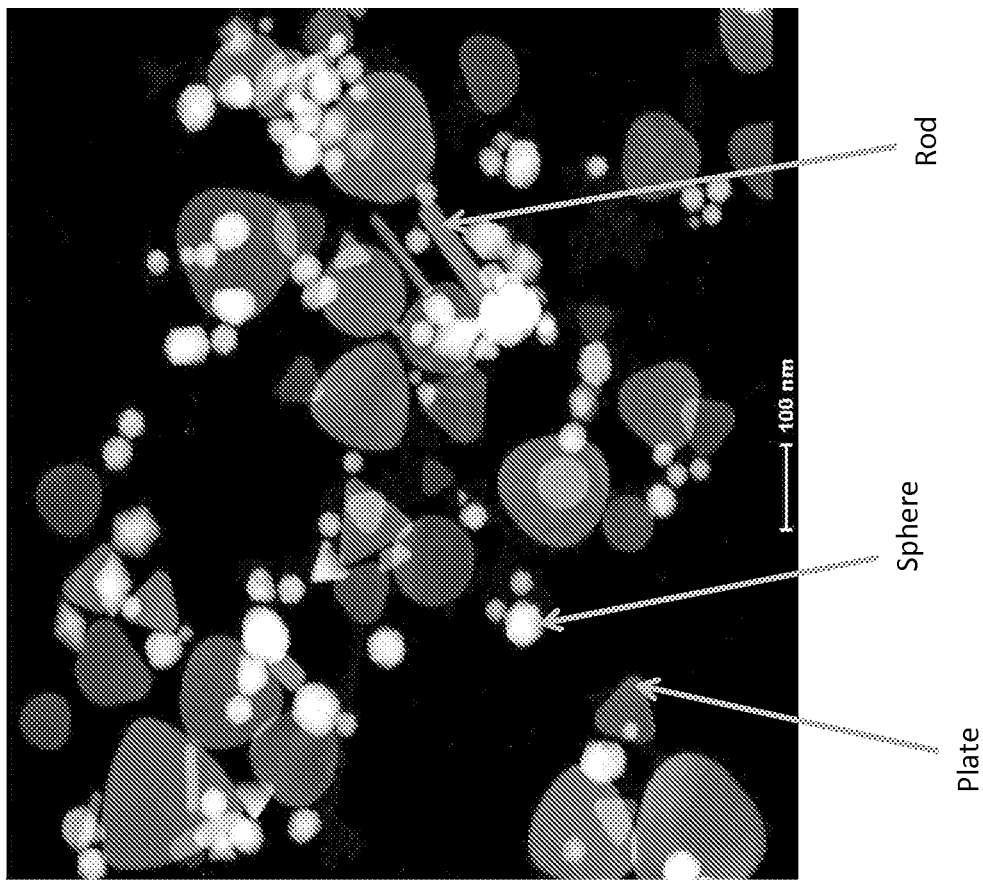
FIG. 2 is a TEM image of a sample including gold nanoparticles.

Referring now to FIG. 2, a sample of gold nanoparticles produced by the disclosed method is shown. Substantially no gold colloid is visible in the image. As shown, gold nanoparticles are formed in a several shapes, including rods, generally triangular plates, and generally spherical bodies. The term "gold nanoparticles" is not shape specific and includes particles of particular shapes and mixtures of shapes. The shape of individual gold nanoparticles within a sample affects the overall absorbance spectrum of the sample. Rod-shaped particles, when oriented on end, provide an absorbance peak at about 530 nm. Therefore, even when substantially all gold colloid is removed from a sample, a measure of absorbance at about 530 nm may still be present. Analysis has shown that the disclosed method produces a nanoparticle shape distribution of 78%±3% spherical, 20%±3% generally triangular plates, and 2%±1% other shapes, including rods.

In some embodiments, a sample contains a gold source and a sulfide source which self-assemble into gold nanoparticles and gold colloid. The sample is placed in a semipermeable membrane configured to exclude based on size, sometimes referred to as a dialysis membrane, and dialyzed against deionized (DI) water or other dialysate during the self-assembly process. In certain embodiments, the gold source and sulfide source are blended in a dialysis membrane. In other embodiments, the gold source and sulfide source are blended together for a specific length of time then transferred into a dialysis membrane which serves as a reaction vessel. In certain embodiments, the gold source and sulfide source are blended in a first chamber, the first chamber being separate from a second chamber by a dialysis membrane. In certain embodiments, the second chamber may be a re-circulating or purged flow water bath. In certain embodiments, the first chamber may be a flow-through dialysis cell. In some embodiments, the gold source and sulfide source are dialyzed against water. In further embodiments, the gold source is dialyzed against the sulfide source. In some embodiments, the sulfide source is dialyzed against the gold source. In certain embodiments, the gold source and sulfide source are combined and dialyzed against a dialysate, such as, for example, water, a salt solution, a glycerol solution, or sodium citrate. In one embodiment, the salt solution is a sodium chloride solution.

As shown in in the examples below, variation in the dialysis time, the MWCO of the dialysis membrane, and the ratio of gold source to sulfide source modifies the quality ratio of the resulting product and the wavelength of the absorbance peak. Without being bound by theory, it is hypothesized that dialysis performed during the self-assembly process forces ion-exchange across the membrane, providing a change in reaction kinetics. This hypothesized change in kinetics results in a shift in the equilibrium of the self-assembly reaction which favors gold nanoparticle production within the dialysis membrane and gold colloid production outside or on the membrane.

Early gold nanoparticle synthesis methods provided quality ratios in the range of 0.4-0.8 prior to any separation steps, such as centrifugation. The one-step synthesis method disclosed in the '792 and '793 applications provided quality ratios in the range of 0.7-1.0, then about 1.7-2.0 after centrifugation. The method disclosed herein has provided quality ratios above 1.8, above 2.0, and above 2.3, without centrifugation, indicating a significantly higher yield of gold nanoparticles.

The examples herein disclose the use of semipermeable membranes to improve the yield of self-assembled gold nanoparticles. However, semipermeable membranes may be used to improve the yield of other self-assembling nanoparticles as well, including seed mediated or other reductions. In further embodiments, a first chemical species and a second chemical species are blended in a first chamber, the first chamber being separated from a second chamber by a dialysis membrane, wherein the first chemical species and the second chemical species self-assemble into a nanoparticle. In certain embodiments, the first chemical species is a gold source and the second chemical species is a sulfide source.

In some embodiments, the first chamber is dialysis membrane tubing and the second chamber is a liquid-filled beaker, vial, vat, tank, bucket, or other container in which the first chamber is placed. In other embodiments, the first and second chambers are subsections of a larger chamber, the subsections being separated by a semipermeable membrane. In other embodiments, a first chemical species may be dialyzed against the second chemical species to form self-assembling nanoparticles. In these embodiments, a first chemical species is added into a first chamber and a second chemical species is added into a second chamber, the first chamber and second chamber being separated by a semipermeable membrane.

The following examples are provided to illustrate certain specific features of working embodiments and general protocols. The scope of the present invention is not limited to those features exemplified by the following examples. Spectral scans disclosed in the examples were obtained using a UV/Vis spectrophotometer (Carey 50 Varian), and all disclosed wavelengths are in nanometer units. Nanometer-scale images were obtained using a tunneling electron microscope ("TEM") (200 kV FEI Tecnai F20).

In some embodiments, reagents are mixed within a chamber while a membrane is present. In this embodiment, the membrane is acting as an adsorptive surface, a site for adsorption and/or seeding. This seeding is preferably selective in that only certain subpopulations of particles are efficiently adsorbed on to the membrane. The subpopulations that adsorb to the membrane are then able to be removed from the reaction mixture by removing the membrane from the reaction mixture. In certain embodiments, the adsorptive surface is chosen to selectively adsorb gold colloid. In other embodiments, the adsorptive surface is chosen to selectively adsorb nanoparticles. In one embodiment, the adsorptive surface is a cellulose acetate membrane which selectively adsorbs gold colloid. In some embodiments, the adsorptive surface is a semipermeable membrane, wherein the efficacy of the membrane in adsorbing subpopulations of particles and affecting the absorbance peak of the nanoparticle-containing solution is dependent upon the surface area of the membrane. The surface area of the membrane may be controlled by selecting the dimensions of the membrane, by selecting the MWCO of the membrane, wherein increasing the size of pores in the membrane decrease the surface of the membrane, or other methods.

Example 1

Fill a 1 L beaker with 800 mL of DI water and include a stir bar. Add a mixture of 11 mL of 1.72 mM $HAuCl_4$ and 3 mL of 3 mM $Na_2S_2O_3$ in a 3500 Da MWCO dialysis membrane and insert in the beaker for 1 hour (sample 1). In this example, the interior of the dialysis membrane serves as the first chamber and the beaker serves as the second chamber. For a non-dialysis control sample, 11 mL of 1.72 mM $HAuCl_4$ and 3 mL of 3 mM $Na_2S_2O_3$ are mixed in a 50 mL tube and reacted for 1 hour (sample 2). Fill a second 1 L beaker with 3 mM $Na_2S_2O_3$. Add 25 mL of 1.72 mM $HAuCl_4$ in a 3500 Da MWCO dialysis membrane to the second beaker and let it react for 1 hour (sample 3).

Figure 3:
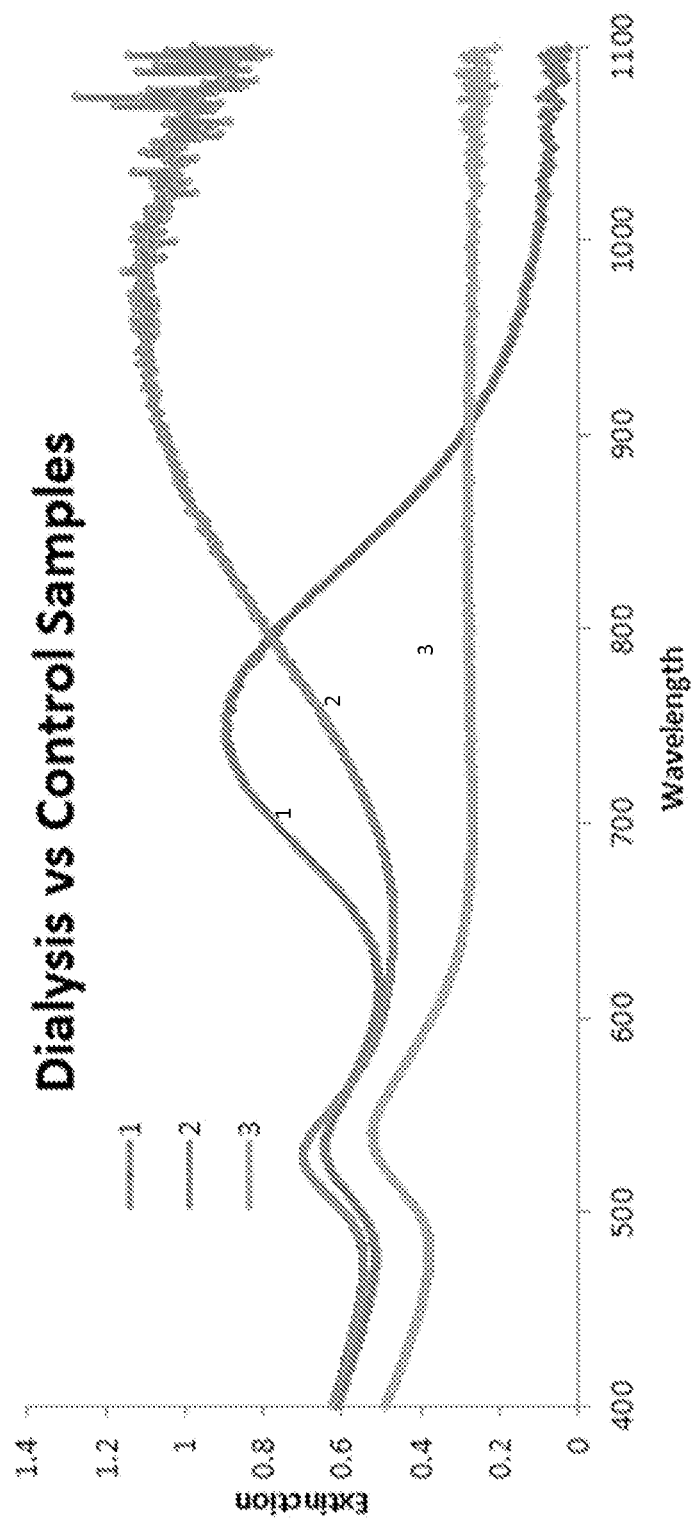
FIG. 3 is a spectral scan of samples from Example 1.

Spectral scans of the samples are shown in FIG. 3. Sample 1 has a peak at 530 nm attributable to gold colloid and a strong, distinct peak in the NIR range attributable to gold nanoparticles. Sample 2 has a peak attributable to gold colloid and strong absorbance NIR range and extending into longer wavelengths. Sample 3 has a peak absorbance at about 530 nm and no peak in the 600-900 nm range, indicating the formation only of gold colloid.

Example 2

Fill a 1 L beaker with 800 mL of DI water and include a stir bar. Add a mixture of 11 mL of 1.72 mM $HAuCl_4$ and 3 mL of 3 mM $Na_2S_2O_3$ in a 3500 MWCO dialysis membrane to the beaker for 1 hour (sample 1). For a non-dialysis sample (sample 2), 11 mL of 1.72 mM $HAuCl_4$ and 3 mL of 3 mM $Na_2S_2O_3$ are mixed in a 50 mL tube and reacted for 1 hour. Separately, fill two 1 L beakers with 3 mM $Na_2S_2O_3$. To each beaker, add 25 mL of 1.72 mM $HAuCl_4$ in a 3500 MWCO dialysis membrane and let them react for 2.5 and 5 hours, respectively (samples 3 and 4).

Figure 4:
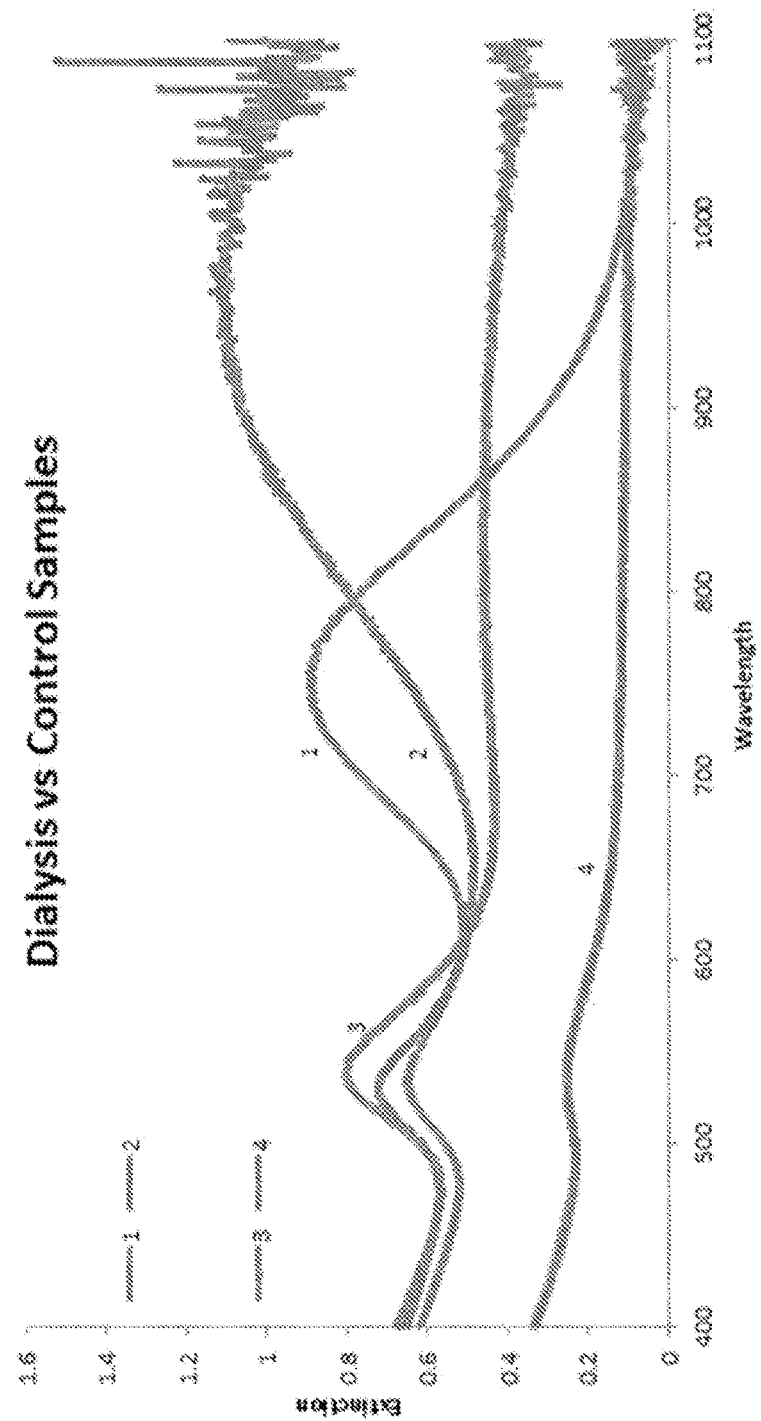
FIG. 4 is a spectral scan of samples from Example 2.

Spectral scans of the samples are shown in FIG. 4. As shown, samples 3 and 4 have negligible gold nanoparticle formation.

Example 3

Fill four 1 L beakers with 800 mL of DI water and stir bar. Place a mixture of 11 mL of 1.72 mM $HAuCl_4$ and 2 mL of 3 mM $Na_2S_2O_3$ in a 3500 MWCO dialysis membrane into two beakers for 1 and 2 hours, respectively (samples 2 and 3 of FIG. 5A). Place a mixture of 11 mL of 1.72 mM $HAuCl_4$ and 3 mL of 3 mM $Na_2S_2O_3$ in a 3500 MWCO dialysis membrane into two beakers for 1 and 2 hours (samples 2 and 3 of FIG. 5B). For a non-dialysis sample (sample 1 of FIGS. 5A and 5B), 11 mL of 1.72 mM $HAuCl_4$ and 2 or 3 mL of 3 mM $Na_2S_2O_3$ are mixed in a 50 mL tube and reacted for 1 hr.

Figure 5B:
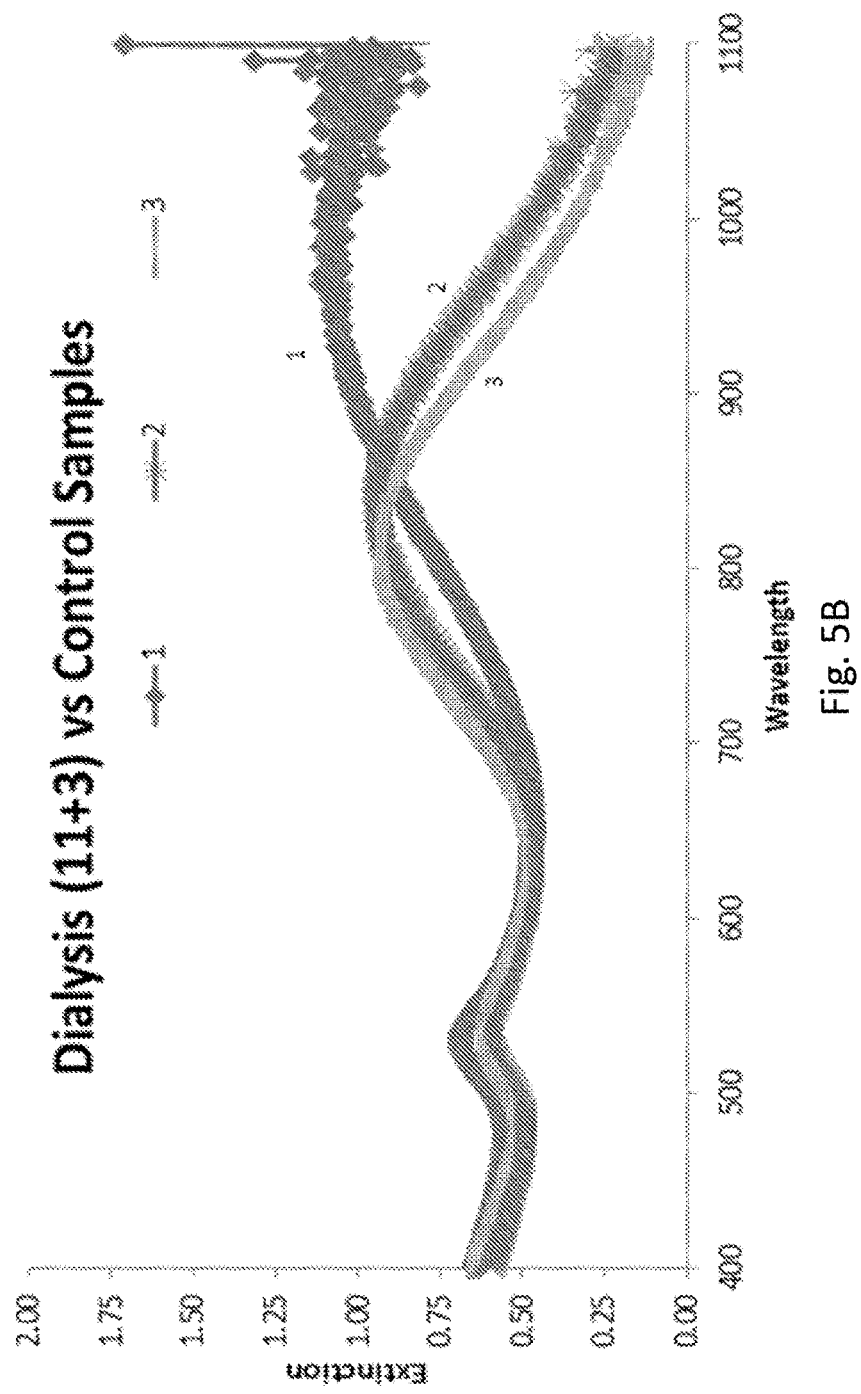

Spectral scans of the samples are shown in FIGS. 5A and 5B. As shown, the sample of 11 mL of 1.72 mM $HAuCl_4$ and 2 mL of 3 mM $Na_2S_2O_3$ dialyzed in a 3500 MWCO dialysis membrane produces the largest peak shift in the NIR range.

Example 4

Fill two 1 L beakers with 800 mL of DI water and stir bar. Maintain a water temperature of about 100° C. Add a mixture of 11 mL of 1.72 mM $HAuCl_4$ and 3 ml of 3 mM $Na_2S_2O_3$ in a 3500 MWCO dialysis membrane for a 5 minute soak (sample 1). Add a mixture of 11 mL of 1.72 mM $HAuCl_4$ and 2 mL of 3 mM $Na_2S_2O_3$ in a 3500 MWCO dialysis membrane for a 15 minute soak (sample 2).

Figure 6:
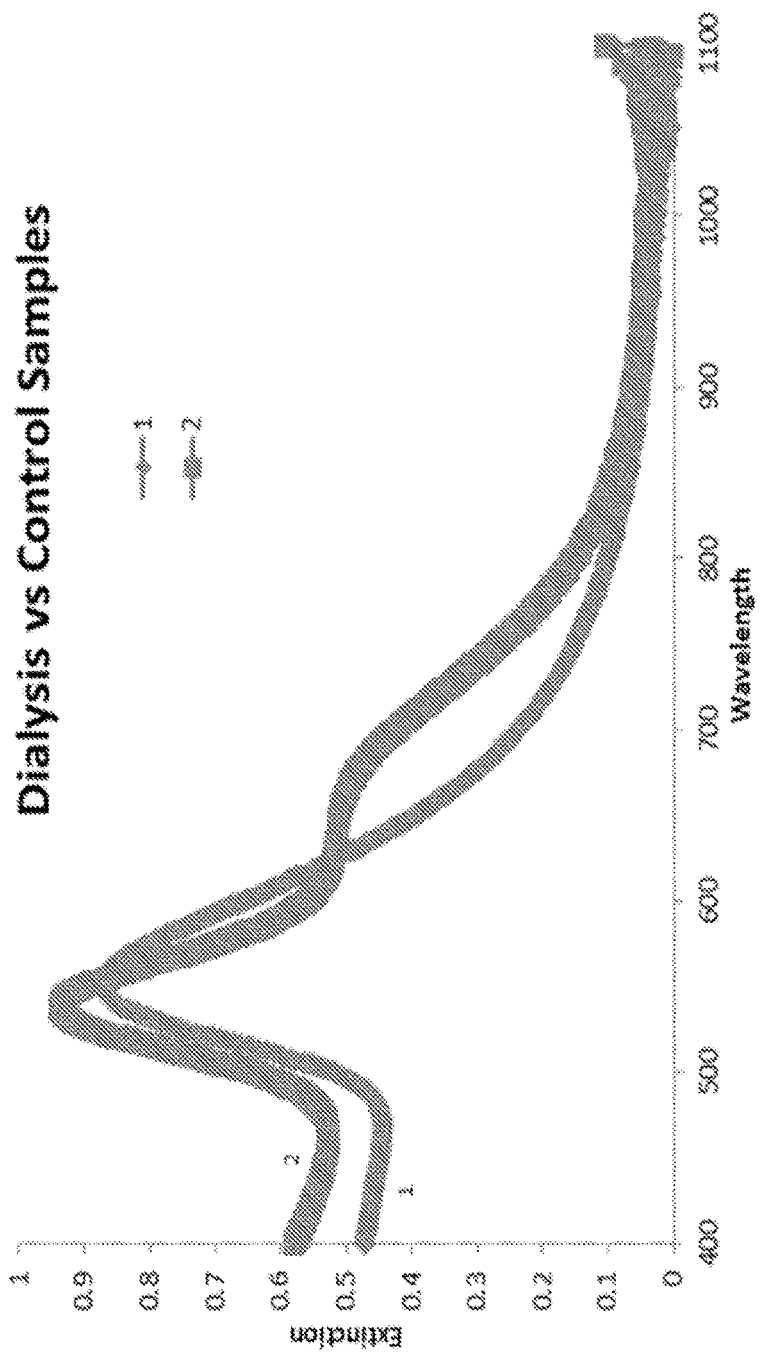
FIG. 6 is a spectral scan of samples from Example 4.

As shown in FIG. 6, neither sample produced a peak in the NIR range.

Example 5

Fill an 8 L bucket with DI water and stir bar. In a 1-step method, a mixture of 11 mL of 1.72 mM $HAuCl_4$ and 3 mL of 3 mM $Na_2S_2O_3$ in a 3500 MWCO dialysis membrane is added for 1 hour (sample 2). Next for a 2-step method, 4 mL of 1.72 mM $HAuCl_4$ and 3 mL of 3 mM $Na_2S_2O_3$ are reacted for 30 seconds in a 50 mL tube, then added into a 3.5 KDa MWCO dialysis membrane with an additional 7 mL of 1.72 mM $HAuCl_4$ to react for an hour (sample 3). For a non-dialysis sample, 11 mL of 1.72 mM $HAuCl_4$ and 3 mL of 3 mM $Na_2S_2O_3$ are mixed in a 50 mL tube and reacted for 1 hour (sample 1).

Figure 7:
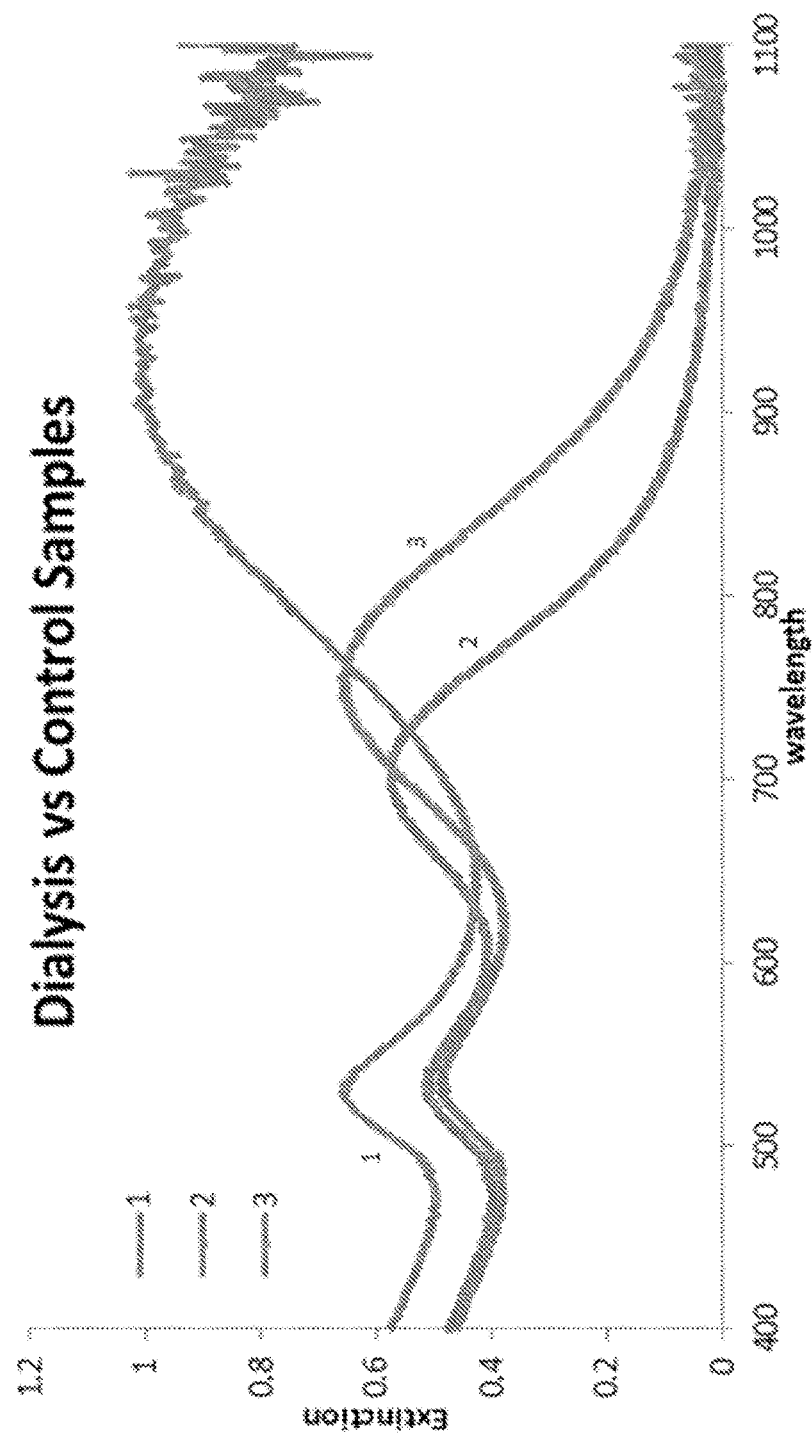
FIG. 7 is a spectral scan of samples from Example 5.

Spectral scans of the samples are shown in FIG. 7. As shown, the two step method of mixing the gold source and sulfide source shortly before insertion into the dialysis membrane resulted in a higher quality ratio, but a lower peak shift, than the one step method disclosed in the '792 and '793 applications.

Example 6

Fill an 8 L bucket with DI water and stir bar. Combine samples of 11 mL of 1.72 mM $HAuCl_4$ and 3 mL of 3 mM $Na_2S_2O_3$ in 3.5 KDa and 12 KDa MWCO dialysis membranes, and allow each to react for an hour (samples 2 and 3 of FIG. 8A). For a 2-step method, react samples of 4 mL of 1.72 mM $HAuCl_4$ and 3 mL of 3 mM $Na_2S_2O_3$ for 30 seconds, and then add 7 mL of 1.72 mM $HAuCl_4$ and place in 3.5 KDa and 12 KDa MWCO dialysis membranes to allow further reaction for an hour (samples 2 and 3 of FIG. 8B). For a non-dialysis sample, 11 mL of 1.72 mM $HAuCl_4$ and 3 mL of 3 mM $Na_2S_2O_3$ are mixed in a 50 mL tube and reacted for 1 hour (sample 1 of FIGS. 8A, 8B and 8C). Additionally, the following controls were also synthesized: 2-step, react samples of 4 mL of 1.72 mM $HAuCl_4$ and 3 mL of 3 mM $Na_2S_2O_3$ for 30 seconds, then add 7 mL of 1.72 mM $HAuCl_4$ and allow to react for 1 hour (sample 2 of FIG. 8C); 1-step dialysis as above using a 12 KDa MWCO dialysis membrane (sample 3 of FIG. 8C); and 2-step dialysis as above using a 12 KDa MWCO dialysis membrane (sample 4 of FIG. 8C).

Figure 8A:
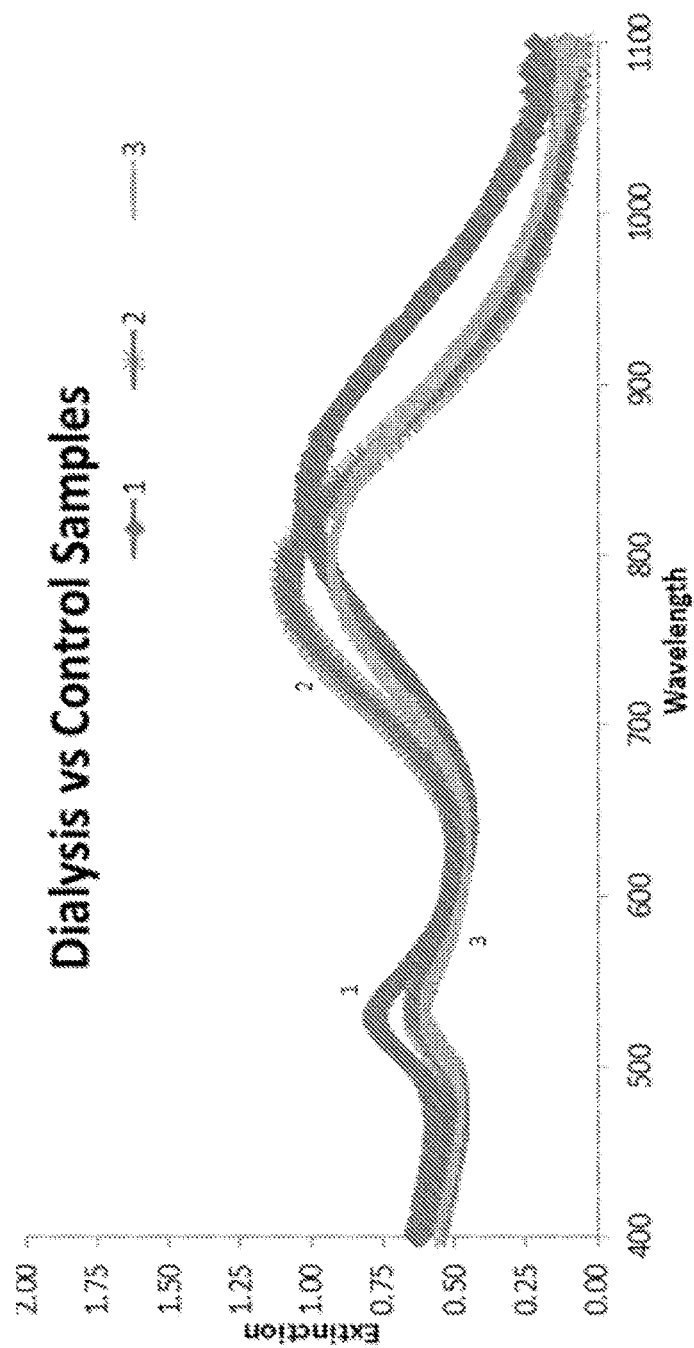
FIGS. 8A-8C are spectral scans of samples from Example 6.
Figure 8B:
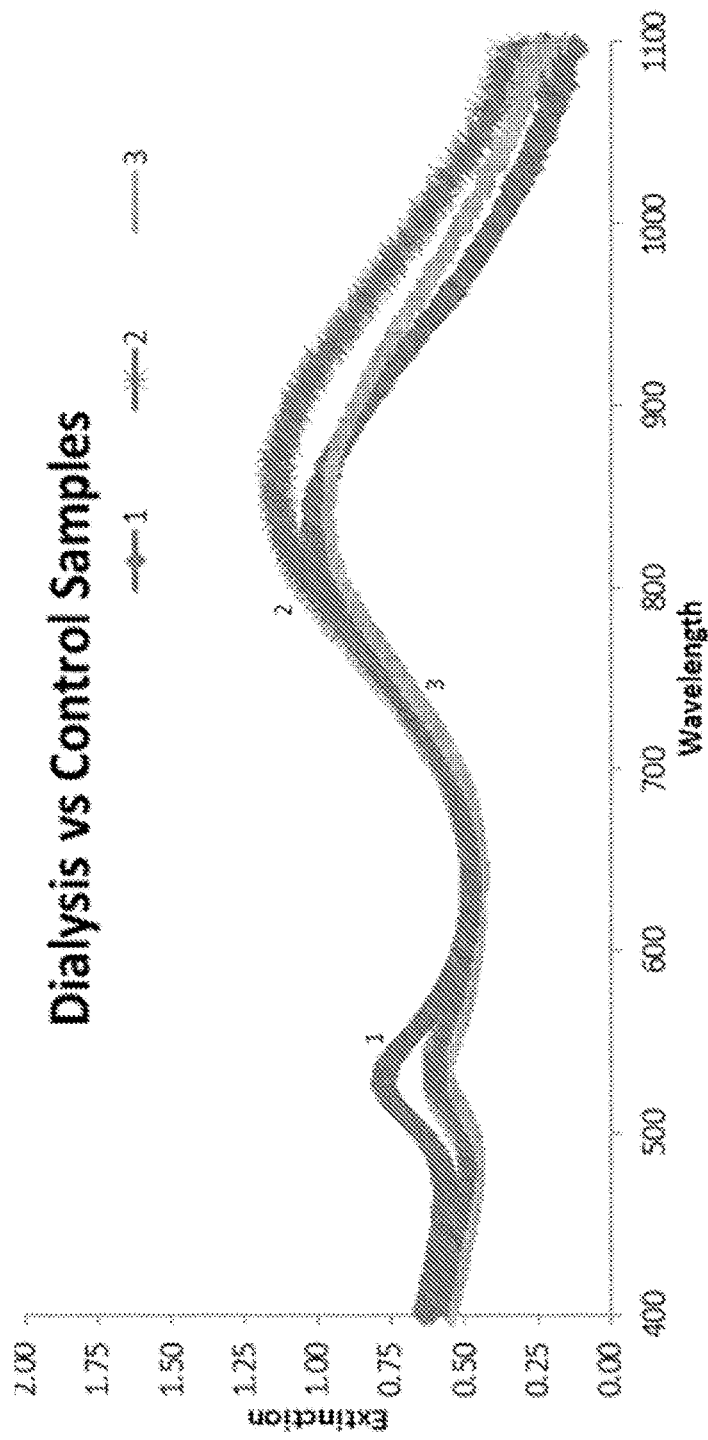
Figure 8C:
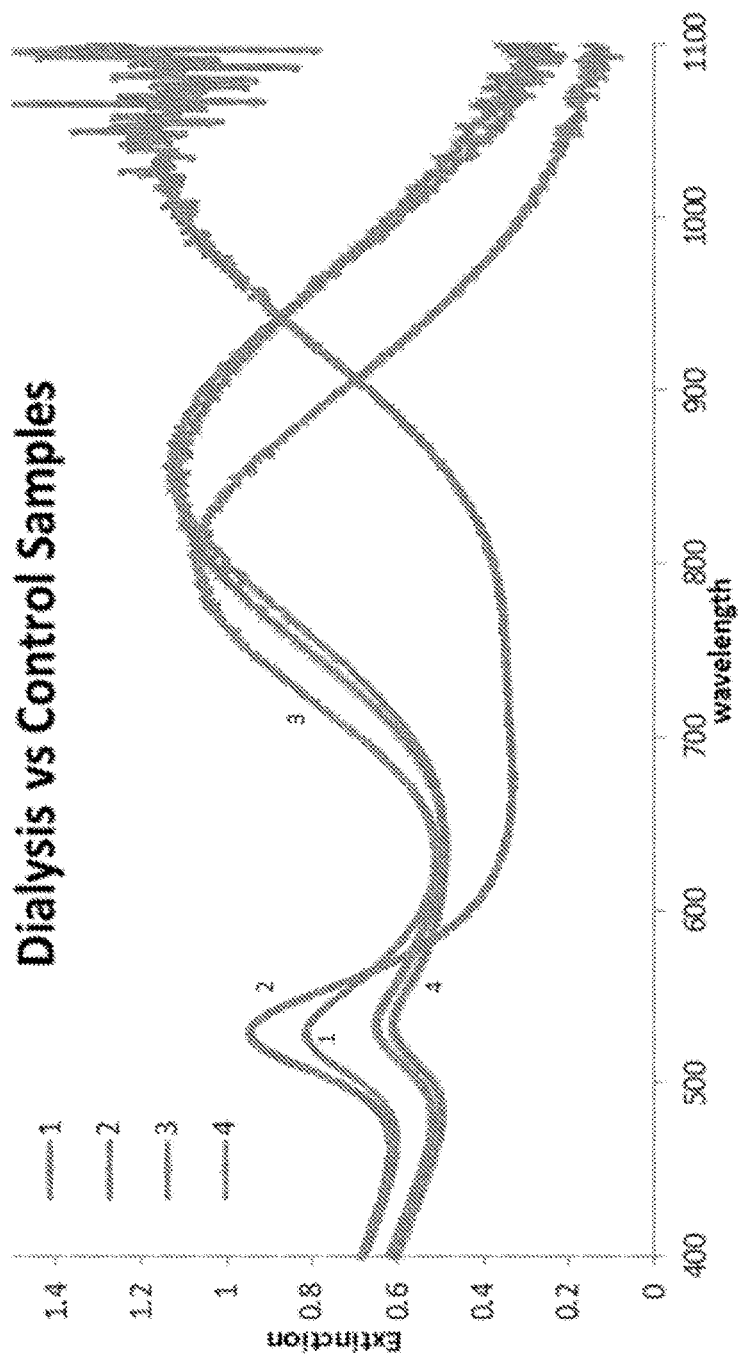

Spectral scans of the samples are shown in FIGS. 8A-8C. In both the 1-step process and 2-step process, dialysis provides a greatly increased quality ratio as compared to the non-dialysis sample, as shown by the relatively small gold colloid peaks. For the 1-step process, FIG. 8A shows that using the 3.5 KDa MWCO dialysis membrane results in a greater peak shift and a higher quality ratio than the 12 KDa MWCO dialysis membrane. In contrast, FIG. 8B shows that using a 3.5 KDa MWCO dialysis membrane results in the NIR absorbance peak shifting to a higher wavelength than the non-dialysis sample for the 2-step process. FIG. 8C shows that the two step process, used without dialysis, does not produce a significant fraction of NIR gold nanoparticles.

Example 7

Fill two 1 L beakers with 800 mL of DI water and stir bar. Maintain a water temperature of 65° C. in one of the beakers, while the other is left at room temperature (RT). Add a mixture of 11 mL of 1.72 mM $HAuCl_4$ and 3 mL of 3 mM $Na_2S_2O_3$ in a 3500 Da MWCO dialysis membrane to the RT beaker (sample 2) and the 65° C. beaker (sample 3), each for 1 hour. For a non-dialysis sample, 11 mL of 1.72 mM $HAuCl_4$ and 3 mL of 3 mM $Na_2S_2O_3$ are mixed in a 50 mL tube and reacted for 1 hour (sample 1).

Figure 9:
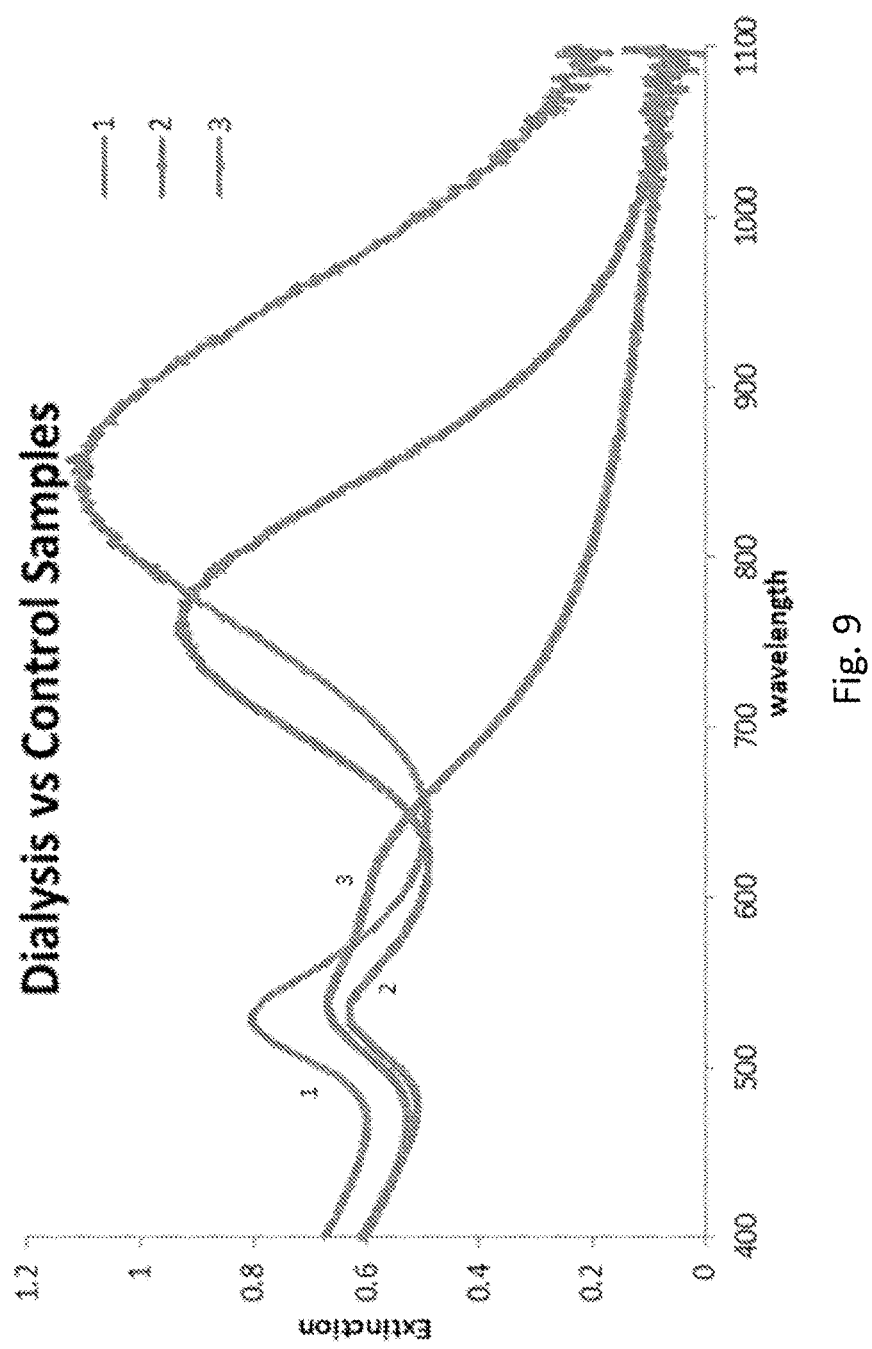
FIG. 9 is a spectral scan of samples from Example 7.

Spectral scans of the samples are shown in FIG. 9. As shown, the yield of gold nanoparticles, as evidenced by the NIR peak, was significantly greater at RT than at the elevated temperature.

Example 8

Fill an 8 L bucket with DI water and stir bar. Add a mixture of 11 mL of 1.72 mM $HAuCl_4$ and 3 mL of 3 mM $Na_2S_2O_3$ in 2 KDa and 3 KDa MWCO dialysis membranes for 1 hour (samples 2 and 3). For a non-dialysis sample, 11 mL of 1.72 mM $HAuCl_4$ and 3 mL of 3 mM $Na_2S_2O_3$ are mixed in a 50 mL tube and reacted for 1 hour (sample 1).

Figure 10:
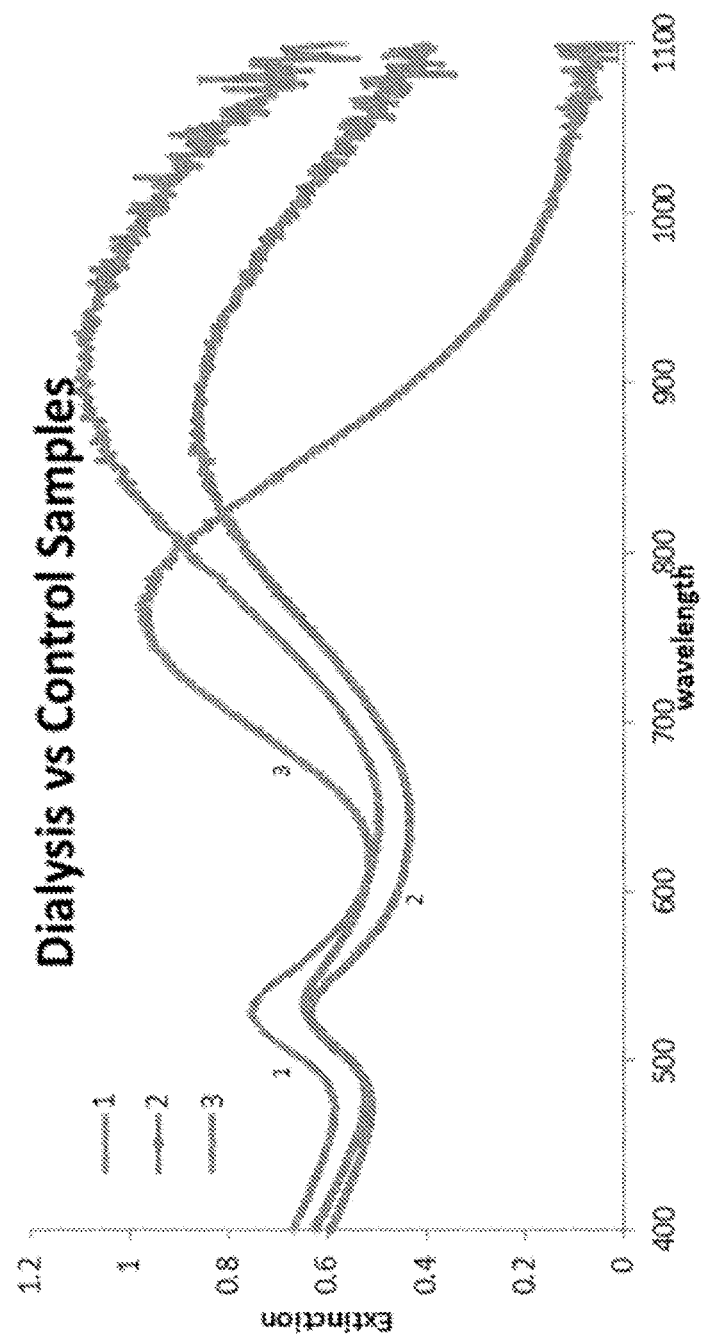
FIG. 10 is a spectral scan of samples from Example 8.

Spectral scans of the samples are shown in FIG. 10. As shown, use of the 3.5 KDa MWCO dialysis membrane provides a significantly larger NIR peak shifts than the 2 KDa MWCO membrane. The following Table 1 is a summary of the absorbance peaks and quality ratios for each sample.

TABLE 1

Summary of Sample Properties in Example 8

| Samples | NIR Absorbance Peak (nm) | Quality Ratio |
| --- | --- | --- |
| Sample 1/No dialysis | 928 | 1.473 |
| Sample 2/2 KDa MWCO | 881 | 1.378 |
| Sample 3/3.5 MWCO | 765 | 1.513 |

Example 9

Figure 11A:
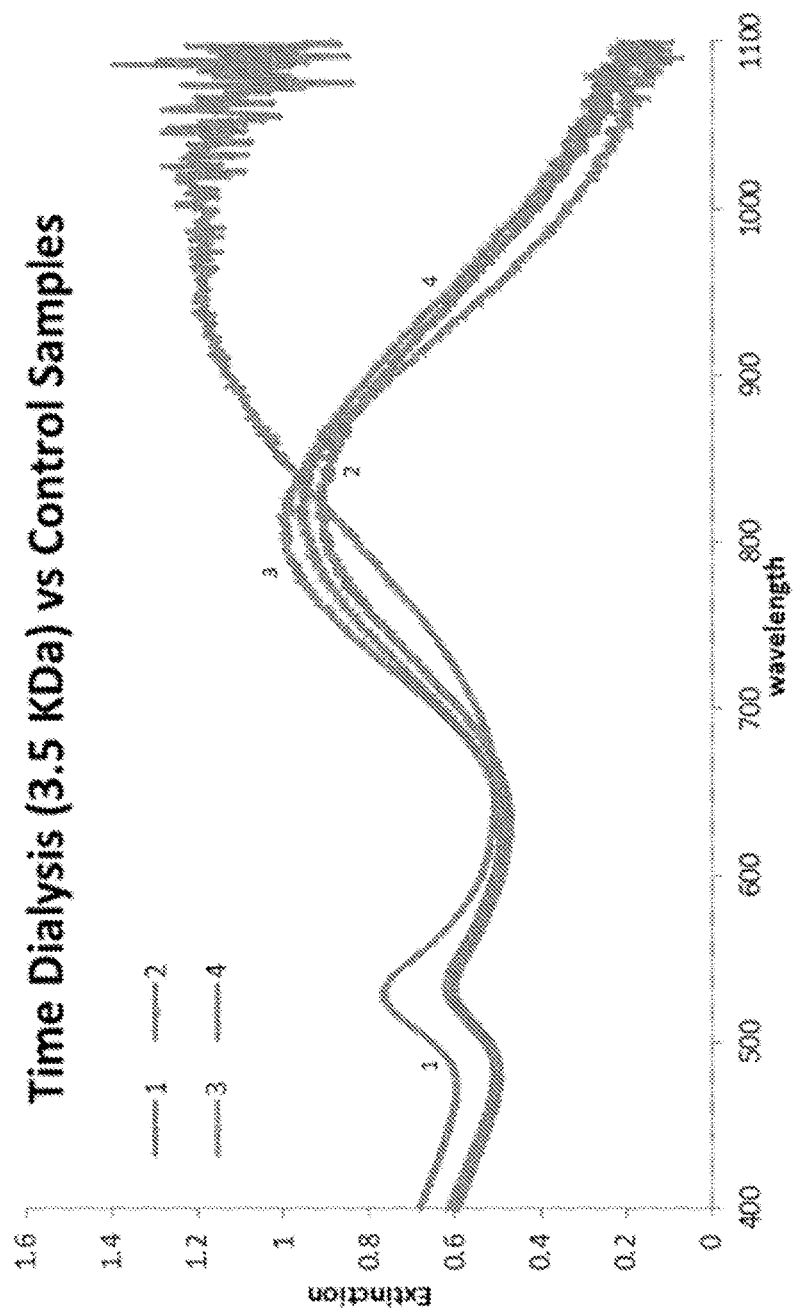
FIGS. 11A-11B are spectral scans of samples from Example 9.
Figure 11B:
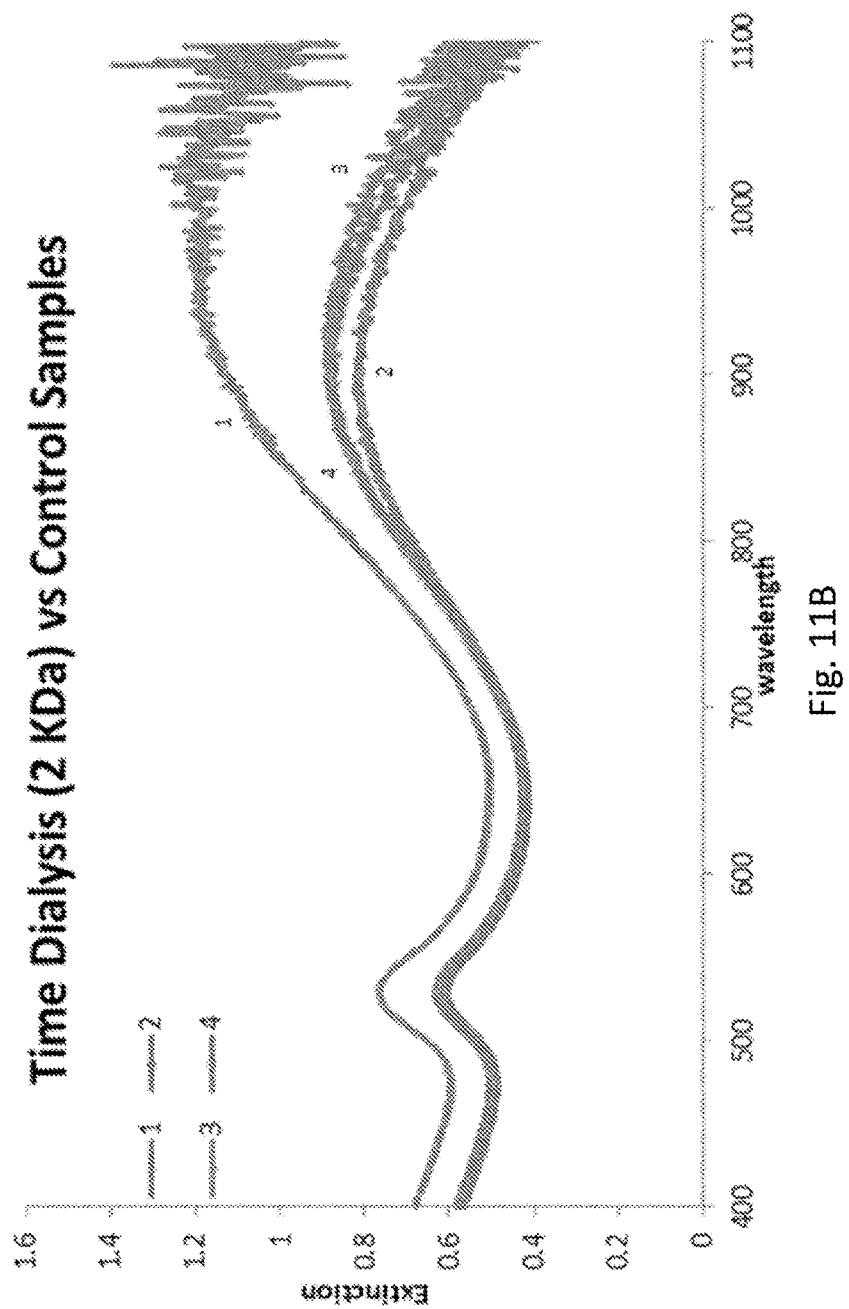

Fill an 8 L bucket with DI water and stir bar. Add mixtures of 11 mL of 1.72 mM $HAuCl_4$ and 3 mL of 3 mM $Na_2S_2O_3$ in three separate 3.5 KDa MWCO dialysis membranes for 1, 2, and 4 hour, respectively (samples 2, 3, and 4 of FIG. 11A). Fill a separate 8 L bucket with DI water and stir bar. Add mixtures of 11 mL of 1.72 mM $HAuCl_4$ and 3 mL of 3 mM $Na_2S_2O_3$ in three separate 2 KDa MWCO dialysis membranes for 1, 2, and 4 hours, respectively (samples 2, 3, and 4 of FIG. 11B). For a non-dialysis sample, 11 mL of 1.72 mM $HAuCl_4$ and 3 mL of 3 mM $Na_2S_2O_3$ are mixed in a 50 mL tube and reacted for 1 hour (sample 1 of FIGS. 11A and 11B). Spectral scans of the samples are shown in FIGS. 11A and 11B.

The following Table 2 is a summary of the absorbance peaks, extinction coefficients, and quality ratios of each sample. For the non-dialyzed "No Dia" control samples, the column "Dialysis Time" simply indicates the delay between mixing the gold and sulfide sources and acquiring the spectral data.

TABLE 2

Summary of Sample Properties in Example 9

| Samples | Dialysis Time (hours) | NIR Absorbance Peak (nm) | Colloid Extinction Coeff. | NIR Extinction Coeff. | Quality Ratio |
| --- | --- | --- | --- | --- | --- |
| No Dia (sample 1, FIGS. 11A and 11B) | 1 | 959 | 0.766 | 1.179 | 1.539 |
| 2K Dia (sample 2, FIG. 11B) | 1 | 899 | 0.605 | 0.821 | 1.357 |
| 2K Dia (sample 3, FIG. 11B) | 2 | 926 | 0.632 | 0.895 | 1.416 |
| 2K Dia (sample 4, FIG. 11B) | 4 | 930 | 0.616 | 0.889 | 1.444 |
| 3.5K Dia (sample 2, FIG. 11A) | 1 | 816 | 0.599 | 0.916 | 1.527 |
| 3.5K Dia (sample 3, FIG. 11A) | 2 | 815 | 0.622 | 1.007 | 1.620 |
| 3.5K Dia (sample 4, FIG. 11A) | 4 | 819 | 0.615 | 0.967 | 1.573 |

Example 10

Fill an 8 L bucket with DI water and stir bar. Add mixtures of 11 mL of 1.72 mM $HAuCl_4$ and 2 mL of 3 mM $Na_2S_2O_3$ in three separate 3.5 KDa MWCO dialysis membranes for 1, 2, and 4 hour, respectively. Also, add mixtures of 11 mL of 1.72 mM $HAuCl_4$ and 2 mL of 3 mM $Na_2S_2O_3$ in three separate 2 KDa MWCO dialysis membranes for 1, 2, and 4 hours. For a non-dialysis sample, 11 mL of 1.72 mM $HAuCl_4$ and 2 mL of 3 mM $Na_2S_2O_3$ are mixed in a 50 mL tube and reacted for 1 hour.

Figure 12:
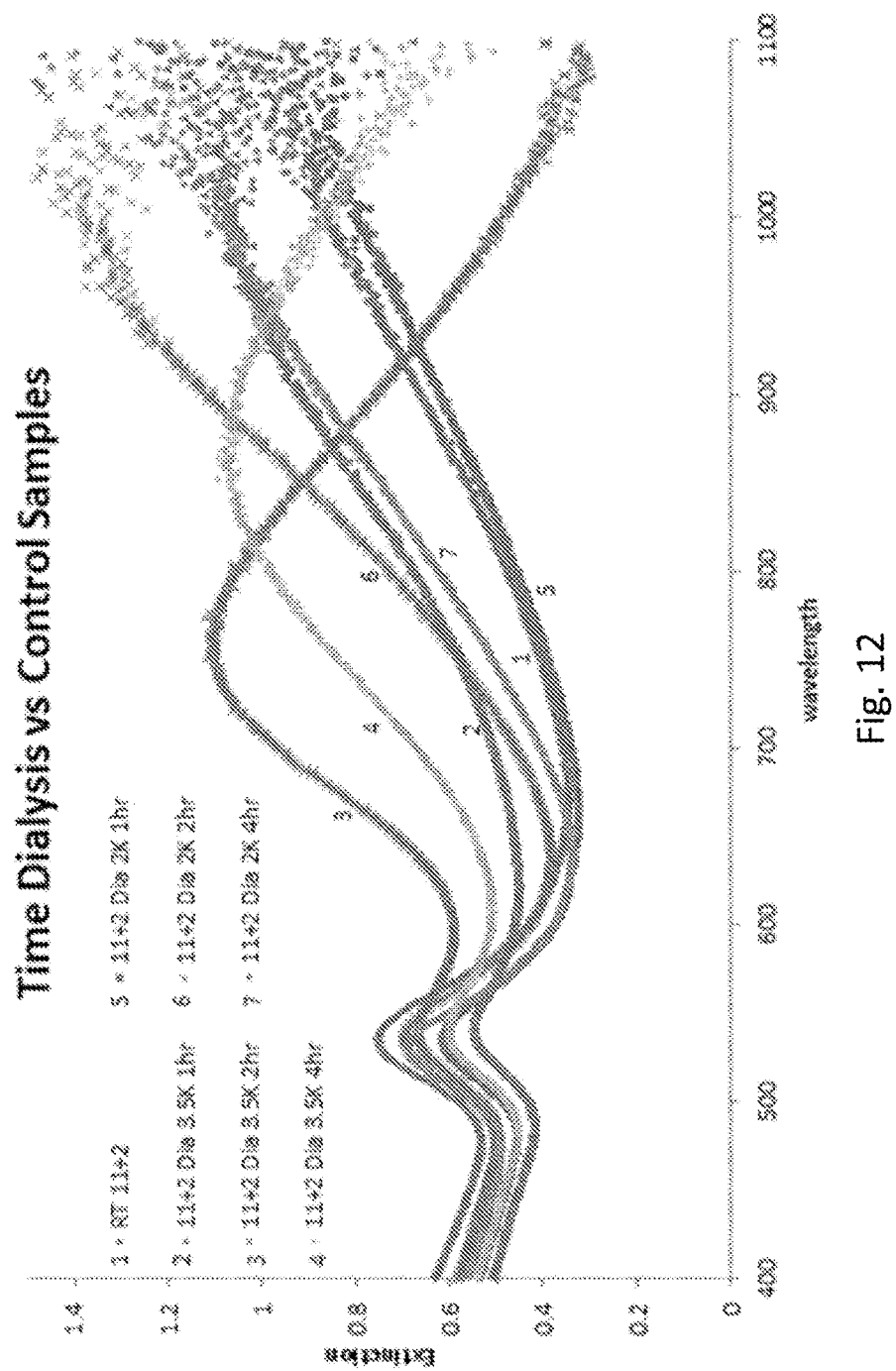
FIG. 12 is a spectral scan of samples from Example 10.

Spectral scans of the samples are shown in FIG. 12. As shown, dialysis using 3.5 KDa MWCO dialysis membranes produced significant peak shifts. Dialysis using 2 KDa MWCO dialysis membranes did not result in distinct peaks in the NIR range.

Example 11

Fill an 8 L bucket with DI water and stir bar. Add mixtures of 11 mL of 1.72 mM $HAuCl_4$ and 2.5, 3, 3.5, 4, 4.5, or 5 mL of 3 mM $Na_2S_2O_3$ in 50 mL tubes, or 2 KDa or 3.5 KDa MWCO dialysis membranes for 1 hour. The following Table 3 is a summary of the samples, their initial ratios, NIR peaks, and quality ratios. An "Initial ratio" is the ratio of the volume of gold source to the volume of sulfide source in a given sample, the concentrations of the gold source and sulfide source remaining constant between compared samples. For example, 11 mL of 1.72 mM $HAuCl_4$ and 2.5 mL of 3 mM $Na_2S_2O_3$ provides an initial ratio of 11/2.5=4.40. Non-dialyzed samples are identified herein as "RT" or room temperature, although all samples were maintained at room temperature throughout the experiment.

TABLE 3

Summary of Sample Properties in Example 11

| Dialysis Method | Sample (vol. gold source + vol. sulfide source) in mL | Initial Ratio (gold source/ sulfide source) | NIR Absorbance Peak (nm) | Quality Ratio |
| --- | --- | --- | --- | --- |
| RT | 11 + 2.5 | 4.40 | none | N/A |
| RT | 11 + 3 | 3.67 | 995 | 1.675 |
| RT | 11 + 3.5 | 3.14 | 901 | 1.398 |
| RT | 11 + 4 | 2.75 | 852 | 1.126 |
| RT | 11 + 4.5 | 2.44 | 807 | 0.895 |
| RT | 11 + 5 | 2.20 | 779 | 0.730 |
| 2 KDa | 11 + 2.5 | 4.40 | 931 | 1.588 |
| 2 KDa | 11 + 3 | 3.67 | 928 | 1.421 |
| 2 KDa | 11 + 3.5 | 3.14 | 950 | 1.436 |
| 2 KDa | 11 + 4 | 2.75 | 848 | 1.209 |
| 2 KDa | 11 + 4.5 | 2.44 | 771 | 0.783 |
| 2 KDa | 11 + 5 | 2.20 | 771 | 0.787 |
| 3.5 KDa | 11 + 2.5 | 4.40 | 789 | 1.804 |
| 3.5 KDa | 11 + 3 | 3.67 | 816 | 1.731 |
| 3.5 KDa | 11 + 3.5 | 3.14 | 820 | 1.621 |
| 3.5 KDa | 11 + 4 | 2.75 | 834 | 1.352 |
| 3.5 KDa | 11 + 4.5 | 2.44 | 789 | 1.038 |
| 3.5 KDa | 11 + 5 | 2.20 | 747 | 0.787 |

Figure 13A:
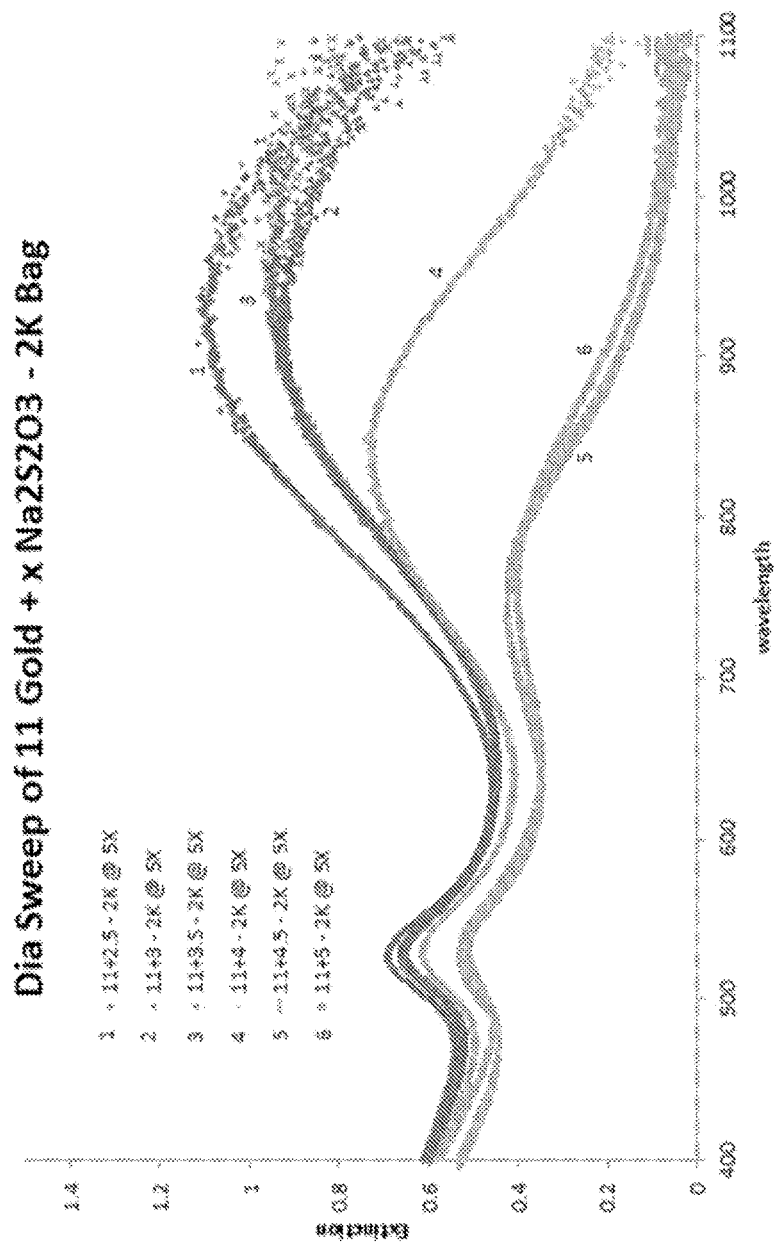
FIGS. 13A-B are a spectral scans of samples from Example 11.
Figure 13B:
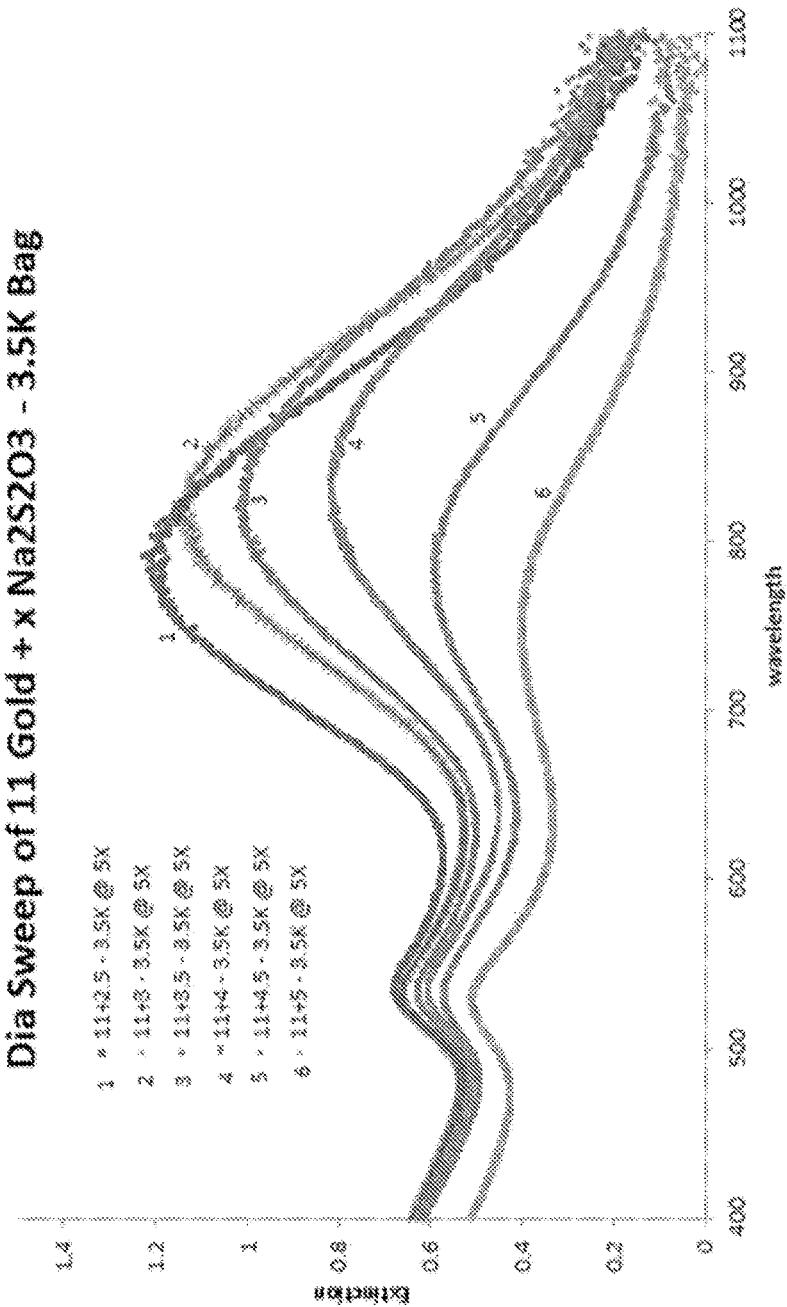
Figure 13D:
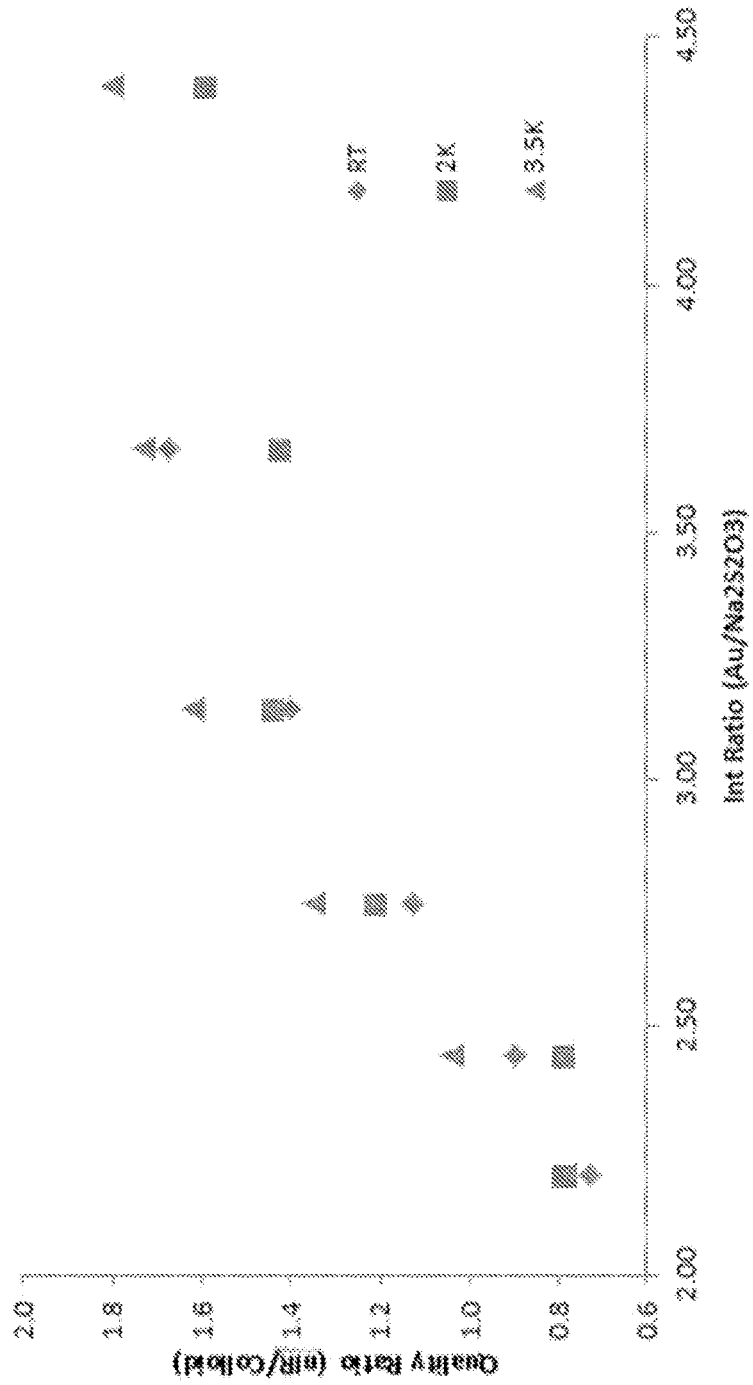
FIG. 13D is a chart showing the relationship between quality ratio and initial ratio.

Spectral scans of selected samples from Table 3 are shown in FIGS. 13A and 13B. More specifically, FIG. 13A includes spectral scans of samples dialyzed in 2 KDa MWCO dialysis membranes and FIG. 13B includes spectral scans of samples dialyzed in 3.5 KDa MWCO dialysis membranes. FIG. 13C depicts the correlation between NIR peak wavelength and initial ratio. FIG. 13D depicts the correlation between quality ratio and initial ratio. Note that in several places in FIGS. 13C and 13D, a diamond symbol identifying a non-dialyzed sample is not visible as it is covered by a square symbol identifying a sample dialyzed in a 2 KDa MWCO dialysis membrane. FIG. 13C indicates that decreasing initial ratios generally correlate with NIR absorbance peaks at lower wavelengths. As shown in FIG. 13D, increasing initial ratios generally correlate with increasing quality ratios.

Example 12

For this experiment, molar concentration of reagents and temperature were kept constant while surface area to volume ratio of the 12 KDa MWCO dialysis membrane (flat width 43 mm) was adjusted. Varying lengths of dialysis membrane were used to show the effect of surface area of the semi-permeable membrane to volume of nanoparticle solution. For example, a dialysis membrane of length 100 mm and width 43 mm has a surface area (for both sides of the membrane) of 8600 $mm^2$ which, when divided by a solution volume of 40 mL, provides a SA/Vol. ratio of 215 $mm^2$/ml. 32.6 mL of 1.72 mM $HAuCl_4$ was poured into the dialysis tube with one end clipped. 7.4 mL of 3 mM $Na_2S_2O_3$ was then added in via pipette to the solution, providing a combined solution volume of 40 mL. All air was removed from the dialysis membrane and the open end of the membrane was clipped. The membrane was then placed inside an oven set at 100° C. To increase the membrane surface-to-air interaction, the dialysis membranes were placed on top of plastic pipette tip holders. A sample was recorded every 5 minutes to determine the when the reaction equilibrium point is reached. Table 1 below shows the NIR peak position.

TABLE 4

Effect of membrane surface area to sample volume on NIR peak

| | Dialysis Membrane Length (mm) | | | |
| --- | --- | --- | --- | --- |
| | 100 | 130 | 175 | 220 |
| | SA/Vol. ($mm^2$/mL) | | | |
| Time (min) | 215 | 280 | 377 | 473 |
| | Wavelength (nm) | | | |
| 5 | 1080 | 1089 | 946 | 843 |
| 10 | 985 | 873 | 753 | 743 |
| 15 | 929 | 797 | 756 | 733 |
| 20 | 831 | 803 | 752 | 730 |
| 25 | 832 | 787 | 751 | 728 |

Figure 14:
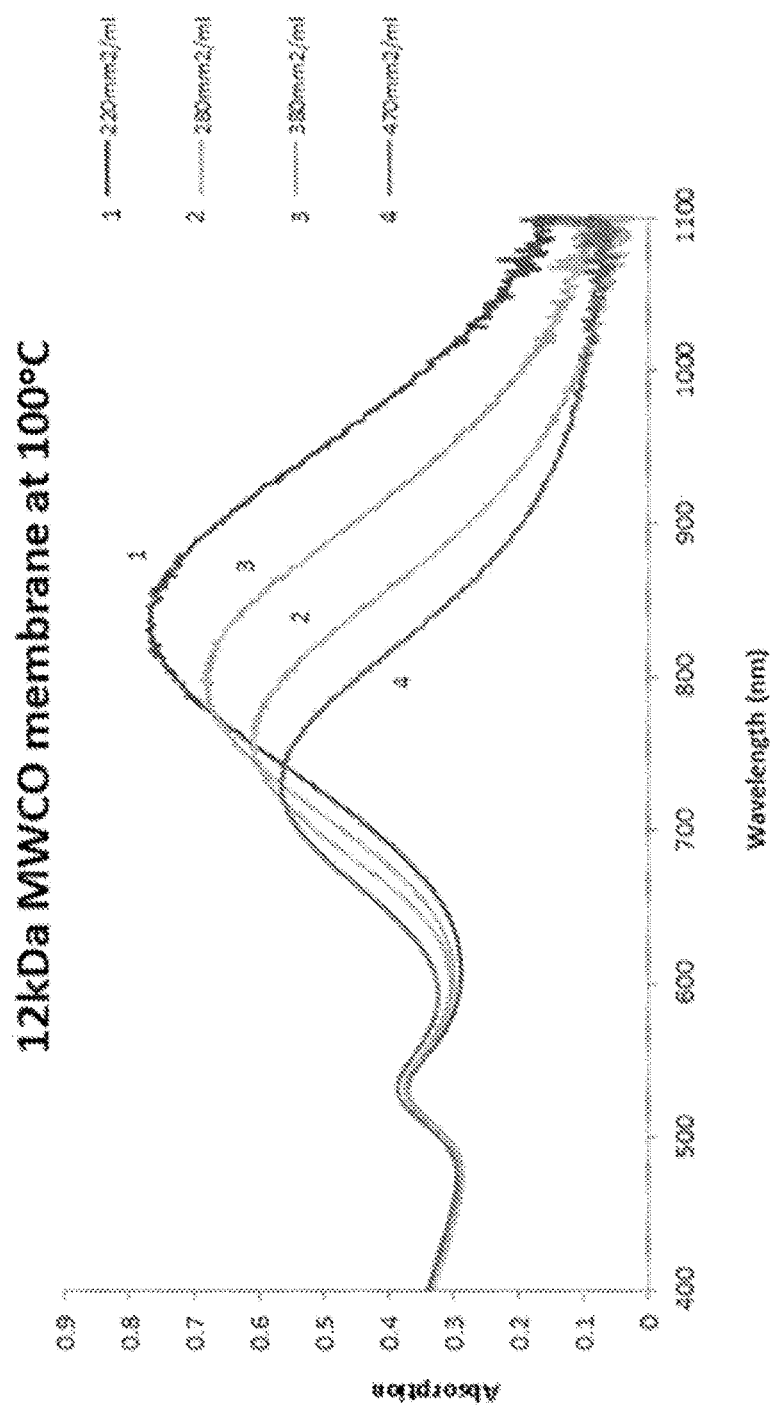
FIG. 14 is a spectral scan of samples from Example 12.

The reaction reached equilibrium after 20 minutes for the 100 mm membrane, 15 minutes for the 130 mm membrane, 10 minutes for the 175 mm membrane, and 10 minutes for the 220 mm membrane. FIG. 14 depicts spectral scans of the nanoparticle solutions at different SA/Vol. ratios, with each depicted sample being the equilibrium sample listed above. As indicated, modification of the SA/Vol. ratio affects the NIR peak of the self-assembling nanoparticles and affects the reaction time to reach equilibrium. For the purposes of this experiment, a reaction is considered to have reached equilibrium when the absorbance peak shifts no more than 5 nm in a 15 minute period.

Example 13

Figure 15:
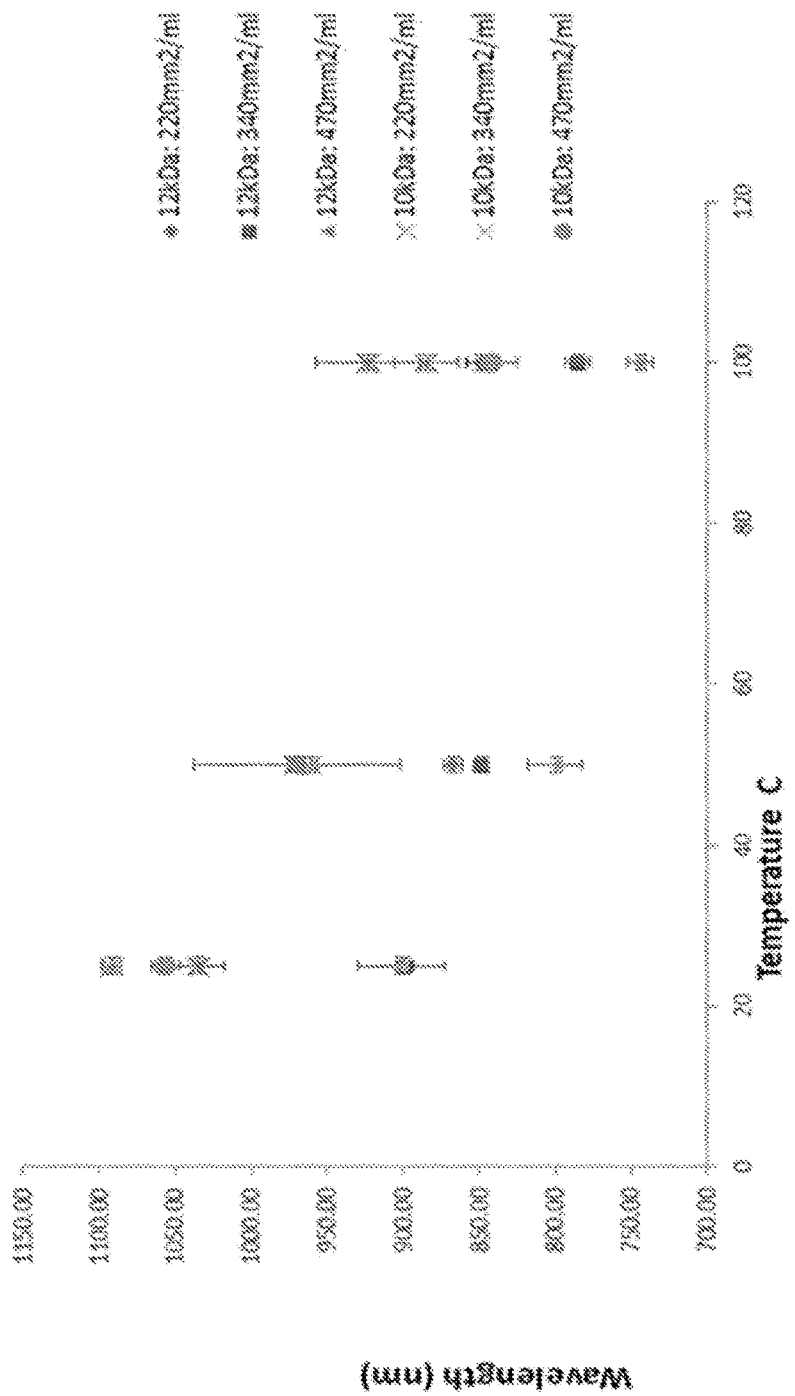
FIG. 15 is a graph comparing NIR peak wavelengths at different temperatures for samples from Example 13 at different surface area to volume ratios.

For this experiment, molar concentration of reagents was kept constant while surface area to volume ratio, MWCO of the dialysis membrane, and temperature were adjusted. Varying lengths of dialysis membrane were used to show the effect of modifying the SA/Vol. ratio, as described in Example 12. 32.6 mL of 1.72 mM $HAuCl_4$ was poured into the dialysis tube with one end clipped. 7.4 mL of 3 mM $Na_2S_2O_3$ was then added in via pipette to the solution. All air was removed from the dialysis membrane and the open end of the membrane was clipped. The membrane was then placed inside an oven set at various temperatures: 100, 50, and 25° C. To increase the membrane surface-to-air interaction, the dialysis membranes were placed on top of plastic pipette tip holders. A sample was recorded every 10 minutes to determine the when the reaction equilibrium point is reached. Three trials were performed for each set of conditions including the 12 KDa MWCO dialysis membrane while two trials were performed for each set of conditions including the 10 KDa MWCO dialysis membrane. FIG. 15 is a graph plotting the NIR peak detected at different temperatures as the MWCO of the dialysis membrane and the SA/Vol. ratio varies. As shown, dialysis in the 12 KDa MWCO dialysis membrane result in gold nanoparticles with a lower NIR peak wavelength at a given temperature and SA/Vol. ratio than does dialysis in the 10 KDa MWCO dialysis membrane. Also, higher temperatures result in lower NIR peak wavelengths at given MWCO and SA/Vol. values.

Example 14

For this experiment, molar concentration of reagents was kept constant while surface area to volume ratio, MWCO of the dialysis membrane, and temperature were adjusted. Two lengths of dialysis membrane were used to show the effect of modifying the SA/Vol. ratio, as described in Example 12. 32.6 mL of 1.72 mM $HAuCl_4$ was poured into the 12 KDA MWCO dialysis tube with one end clipped. 7.4 mL of 3 mM $Na_2S_2O_3$ was then added in via pipette to the solution. All air was removed from the dialysis membrane and the open end of the membrane was clipped. The membrane was then placed inside a 2 L beaker filled with DI water with a stir bar on a low setting. Two different water temperatures were used to show the effect of temperature on the reaction: 50 and 25° C. A sample was recorded every 10 minutes to determine the when the reaction equilibrium point is reached. Three trials were performed for each set of conditions.

Figure 16:
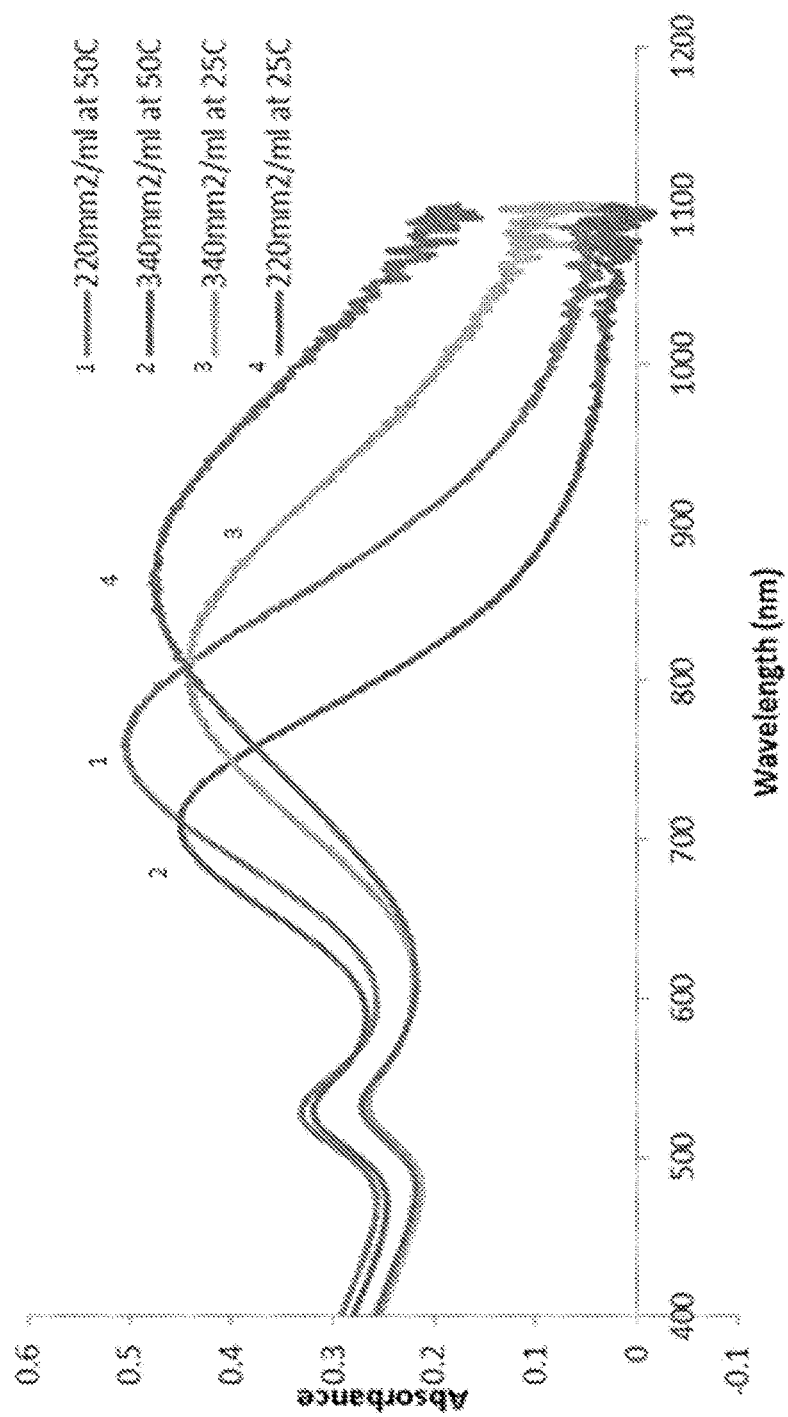
FIG. 16 is a spectral scan of samples from Example 14.

FIG. 16 depicts spectral scans of the nanoparticle solutions at different SA/Vol. ratios and temperatures, with each depicted sample being taken from the time point after reaction equilibrium was reached. As shown in the air-exposed samples in Example 13, the samples dialyzed against water in this example also provided lower NIR peak wavelengths when exposed to higher temperatures. Higher SA/Vol. ratios resulted in lower NIR peak wavelengths at a given temperature.

Example 15

For this experiment, molar concentration of reagents was kept constant while surface area to volume ratio, MWCO of the dialysis membrane, and temperature were adjusted. Three lengths of dialysis membrane, 100, 150, and 200 mm, were used to show the effect of modifying the SA/Vol. ratio, as described in Example 12. 32.6 mL of 1.72 mM $HAuCl_4$ was poured into the 12 KDA MWCO dialysis tube with one end clipped. 7.4 mL of 3 mM $Na_2S_2O_3$ was then added in via pipette to the solution. All air was removed from the dialysis membrane and the open end of the membrane was clipped. The membrane was then placed inside a 2 L beaker filled with DI water with a stir bar on a low setting. Two different water temperatures were used to show the effect of temperature on the reaction: 50, 37, and 25° C. A sample was recorded every 10 minutes to determine the when the reaction equilibrium point is reached. Three trials were performed for each set of conditions.

Figure 17:
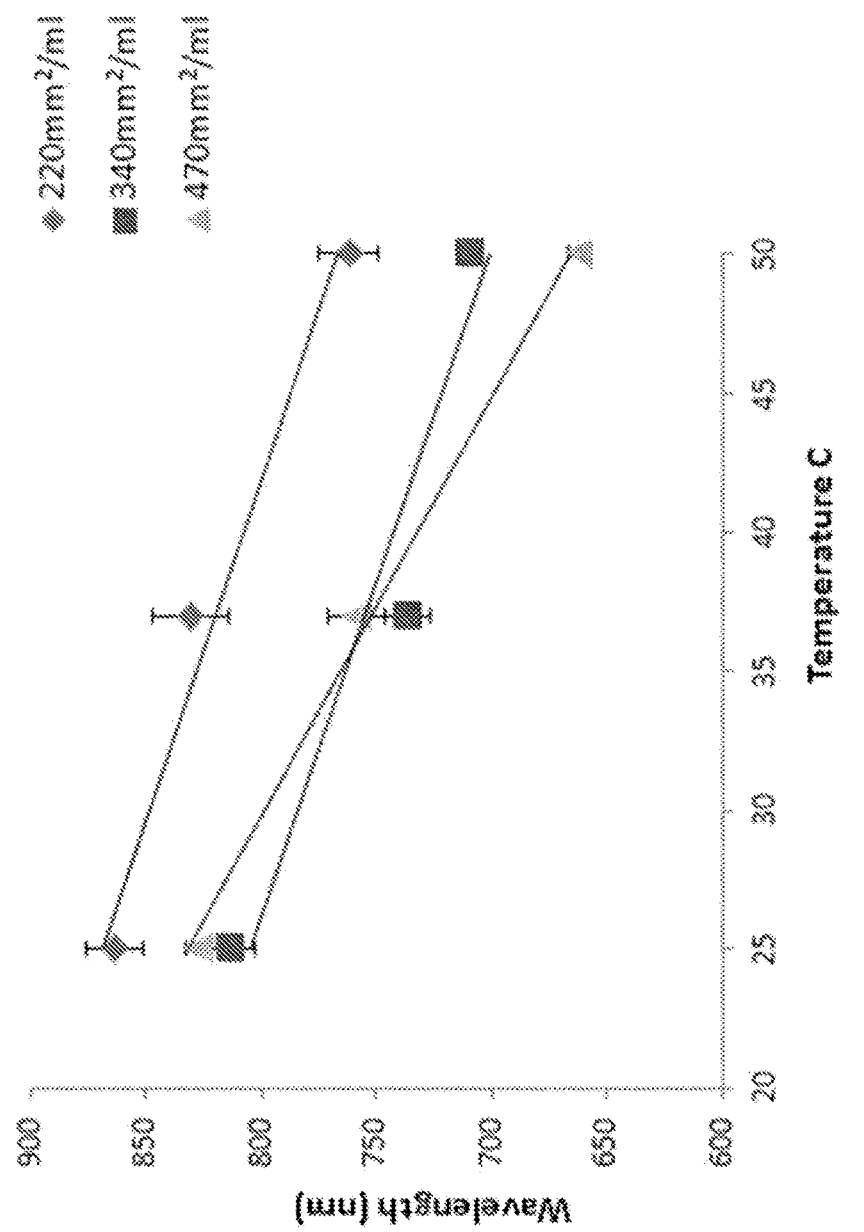
FIG. 17 is a graph comparing NIR peak wavelengths at different temperatures for samples from Example 15 at different surface area to volume ratios.

FIG. 17 depicts spectral scans of the nanoparticle solutions at different SA/Vol. ratios and temperatures, with each depicted sample being taken from the time point after reaction equilibrium was reached. As shown in the air-exposed samples in Example 13 and the water-exposed samples in Example 14, the samples in this example also provided lower NIR peak wavelengths when exposed to higher temperatures. At a given temperature, nanoparticles produced from dialysis with SA/Vol. ratios of 340 $mm^2/mL$ and 470 $mm^2/mL$ resulted in had lower NIR peak wavelengths than nanoparticles produced from dialysis with a SA/Vol. ratio of 220 $mm^2/mL$.

Example 16

This experiment was designed to compare synthesis of gold nanoparticles using different dialysis membranes submerged in solution verse synthesis without dialysis. Fill four 8 L buckets with 7.5-8 L of DI water and place a stir bar inside each. Next, prepare and add 4 mixtures of 11 mL 1.72 mM $HAuCl_4$ (added to the dialysis membrane first) and 2.5 mL 3 mM $Na_2S_2O_3$ (added to the dialysis membrane second) to 2, 3.5, 6-8, and 12 KDa MWCO membrane, and let the samples dialyze for one hour. Then, for a non-dialysis sample, 11 mL 1.72 mM $HAuCl_4$ and 2.5 mL 3 mM $Na_2S_2O_3$ is mixed in a 50 mL tube and reacted for one hour. Spectral scans are obtained for each sample after an hour of self-assembly synthesis at room temperature using a UV/Vis spectrophotometer (Carey 50 Varian). The spectral scans are shown in FIG. 18, and the detected NIR wavelength peaks and calculated quality ratios are listed in Table 4 below.

TABLE 4

| Effect of dialysis membrane MWCO on NIR peak | | |
|---|---|---|
| Sample | NIR Wavelength Peak (nm) | Quality Ratio |
| No Dialysis | 1098 | 2.58 |
| 2 KDa MWCO | 858 | 1.35 |
| 3.5 KDa MWCO | 748 | 1.54 |
| 6-8 KDa MWCO | 744 | 1.57 |
| 12 KDa MWCO | 799 | 1.65 |

Figure 18:
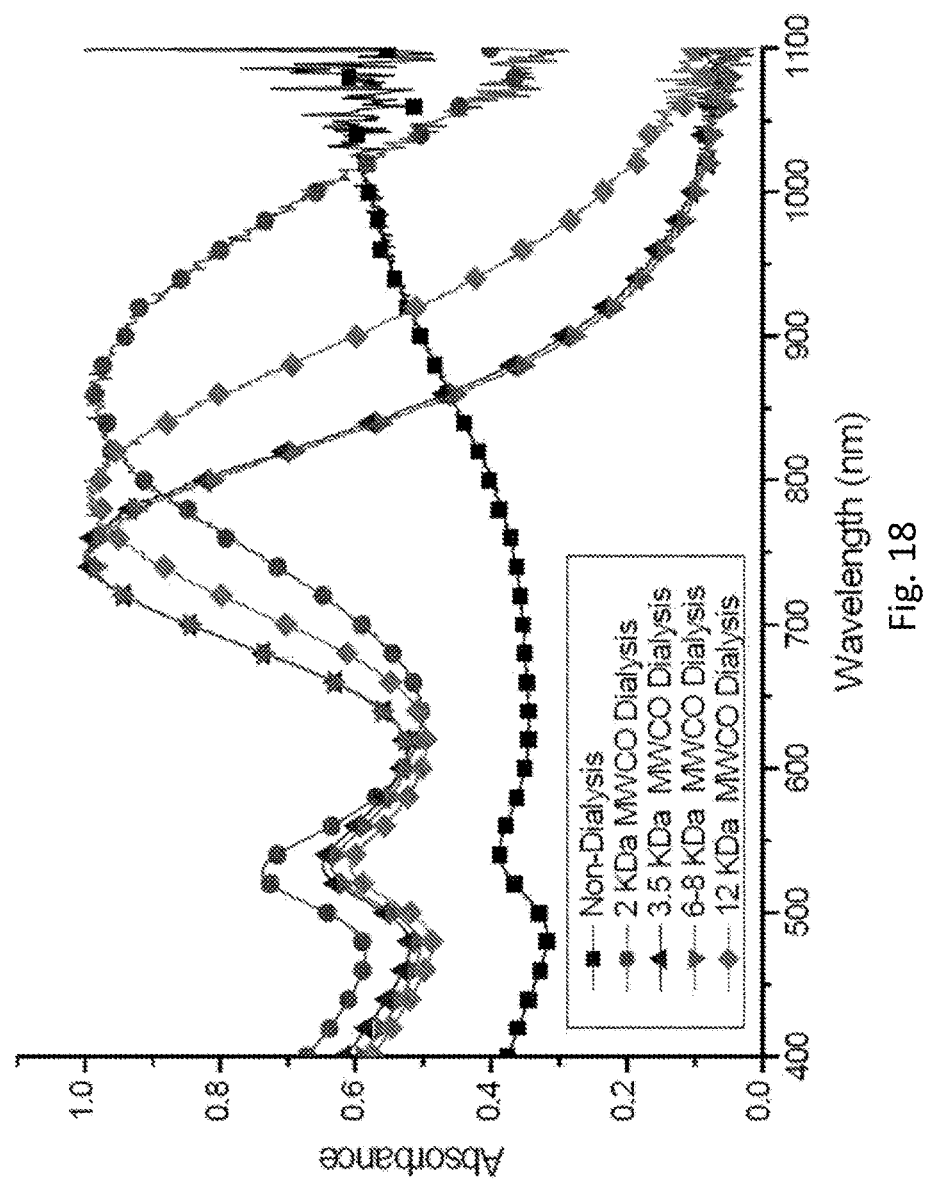
FIG. 18 is a spectral scan of samples from Example 16.

As shown in FIG. 18, dialysis using the 12 KDa MWCO dialysis membrane provided the highest quality ratio for samples with NIR peaks in the preferred 600-900 nm range. This was an unexpected result, as the relatively larger pores in the 12 KDa membrane would be less effective at preventing $HAuCl_4$, $Na_2S_2O_3$, and resulting nanoparticles from escaping the interior of the membrane-shaped membrane as compared to membranes with smaller pores.

Example 17

Figure 19:
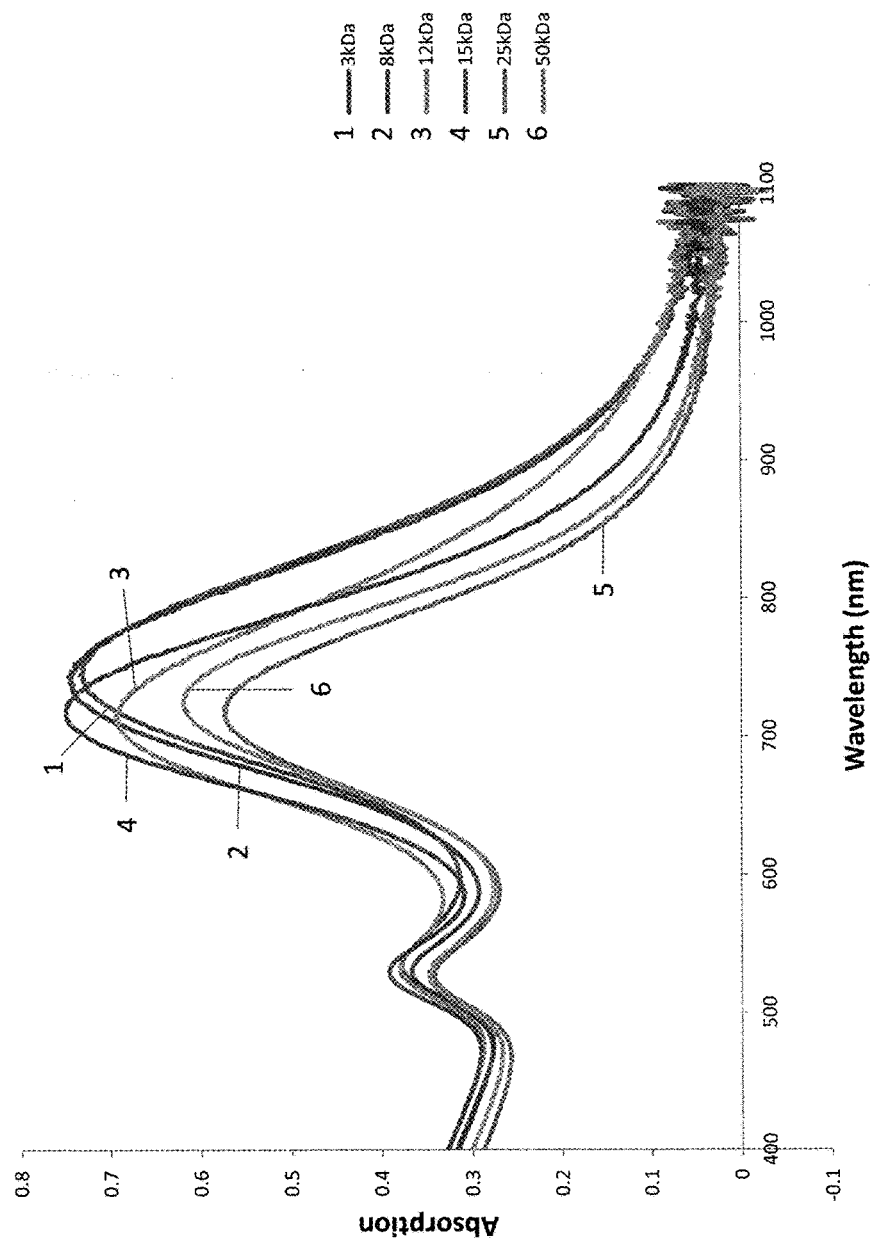
FIG. 19 is a spectral scan of samples from Example 17.

This experiment was designed to compare synthesis of gold nanoparticles using different dialysis membranes submerged in solution at 40° C. Fill six 8 L buckets with 7.5-8 L of 40° C. DI water and place a stir bar inside each. Next, prepare and add 6 mixtures of 32.6 mL 1.72 mM $HAuCl_4$ (added to the dialysis membrane first) and 7.4 mL 3 mM $Na_2S_2O_3$ (added to the dialysis membrane second) to 3.5, 8, 12, 15, 25, and 50 KDa MWCO membrane, and let the samples dialyze for 30 minutes. Spectral scans are obtained for each sample after 30 minutes of self-assembly synthesis at 40° C. using a UV/Vis spectrophotometer (Carey 50 Varian). The spectral scans are shown in FIG. 19, and the detected NIR wavelength peaks and calculated quality ratios are listed in Table 5 below. This experiment was performed 3 times (n=3).

TABLE 5

Effect of dialysis membrane MWCO on NIR peak at 40° C.

| Sample (MWCO) | NIR Wavelength Peak (nm) | Standard Deviation (n = 3) | Quality Ratio | Standard Deviation (n = 3) |
|---|---|---|---|---|
| 3.5 KDa | 747 | 19 | 1.97 | 0.05 |
| 8 KDa | 740 | 22 | 2.09 | 0.10 |
| 12 KDa | 722 | 19 | 1.90 | 0.04 |
| 15 KDa | 719 | 20 | 1.96 | 0.19 |
| 25 KDa | 718 | 3 | 1.70 | 0.02 |
| 50 KDa | 725 | 7 | 1.79 | 0.06 |

As shown in FIG. 19, dialysis using the 8 KDa MWCO dialysis membrane at 40° C. provided the highest quality ratio for samples with NIR peaks in the preferred 600-900 nm range.

Example 18

As shown in FIG. 19, this experiment was designed to compare the yield of synthesis of gold nanoparticles using a dialysis membrane against non-dialysis synthesis including separation by centrifugation. For the dialysis sample, $HAuCl_4$ and $Na_2S_2O_3$ was added to a 12 KDa MWCO dialysis membrane, and allowed to dialyze for one hour. Then, for a non-dialysis sample, equal amounts of $HAuCl_4$ and $Na_2S_2O_3$ is mixed in a tube and reacted for one hour. As made, the dialysis method produced a 55 mL nanoparticle solution with an optical density (OD) of 7.5. The non-dialysis method produced a 55 mL nanoparticle solution with an OD of 2.5. After three rounds of centrifugation, the non-dialysis solution was concentrated to a 0.34 mL solution at an OD of 117. The final quality ratios of the methods were generally equal (2.36 dialysis/2.38 non-dialysis), but the yield from the dialysis method was approximately 10 fold higher (412.5 dialysis/39.8 non-dialysis).

Example 19

This experiment was designed to test the effectiveness of the membrane as an adsorption/seeding site for the colloid gold (<10 nm) without dialysis. For this experiment, 7.4 mL of 3 mM $Na_2S_2O_3$ was mixed with 32.6 mL of 1.72 mM $HAuCl_4$ inside a 50 mL test tube. Next add in a 12 KDa MWCO membrane to the solution while maximizing the surface area to volume ratio (SA/Vol). Varying surface areas (0 $mm^2$/mL (no membrane), 320 $mm^2$/mL, 650 $mm^2$/mL, and 1075 $mm^2$/mL) of semipermeable membrane were present in the solution for 1 hr, then removed from the solution. The membrane was cut with scissors to achieve maximum SA/Vol ratio during synthesis. As such, the membrane did not serve to subdivide the test tube and require passage through the membrane for movement of particles throughout the test tube, as in dialysis or filtration, but instead permitted mixing of the gold source, sulfide source, nanoparticles and gold colloid. Three trials were performed for each SA/Vol ratio.

Figure 20:
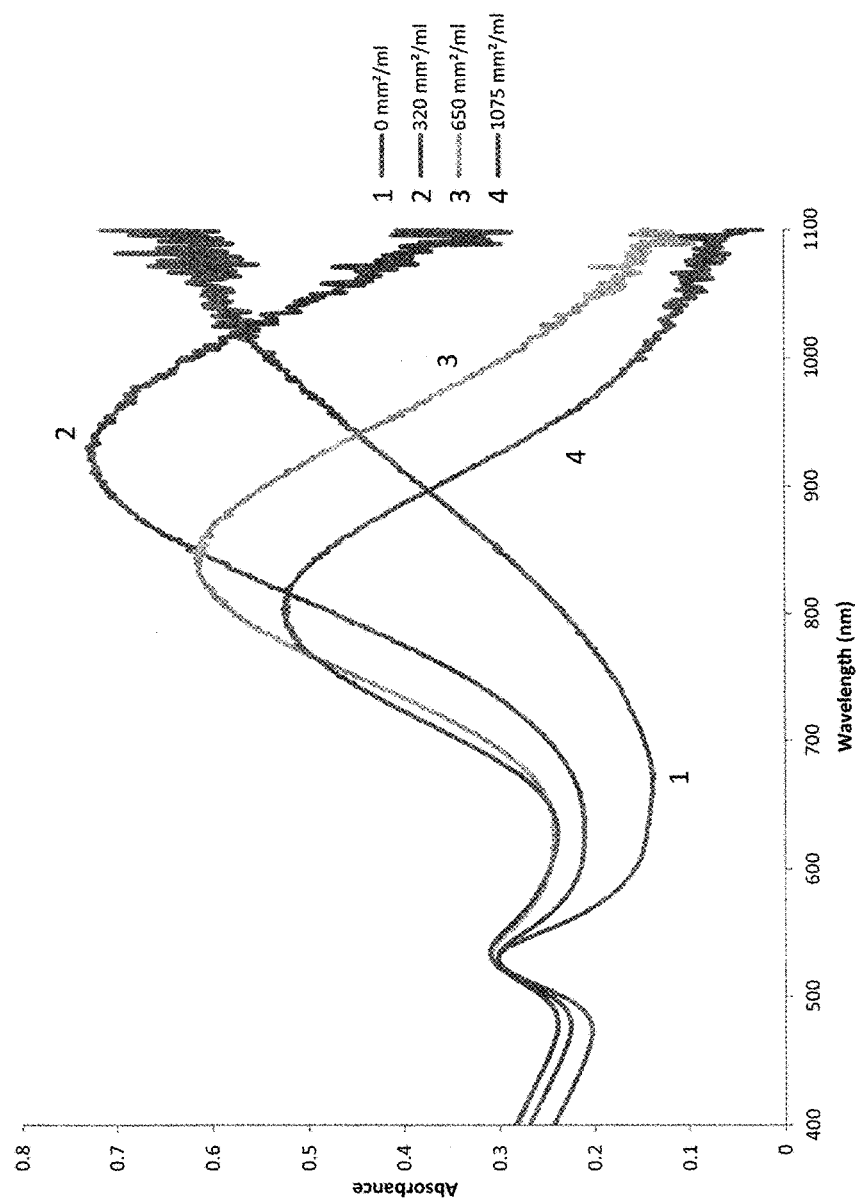
FIG. 20 is a spectral scan of samples from Example 18.

FIG. 20 shows the spectral scan of the nanoparticle solutions at different SA/Vol ratios with each being measured after 1 hr from the initial reaction. As shown in the scan, increasing the surface area to volume ratio (SA/Vol) decreases the absorbance wavelength. Without being bound by theory, it is understood that the change in absorbance wavelength in the nanoparticles solutions is due to removal of gold colloid from the solutions, the gold colloid having been removed along with the membranes.

Various aspects of different embodiments of the present invention are expressed in paragraphs X1, X2 and X3, as follows:

X1. One aspect of the present invention pertains to a method for making nanoparticles, the method comprising providing a chamber including an adsorptive surface, and combining a gold source and a sulfide source in the chamber, wherein the gold source and sulfide source self-assemble into nanoparticles and gold colloid, and wherein one of the gold colloid and the nanoparticles is selectively adsorbed to the adsorptive surface.

X2. Another aspect of the present invention pertains to a method for self-assembly of nanoparticles, the method comprising providing a solution including a gold source and a sulfide source, providing an adsorptive surface, and placing the solution and the adsorptive surface in a chamber, wherein the gold source and the sulfide source self-assemble into nanoparticles and gold colloid, and wherein the gold colloid is selectively adsorbed to the adsorptive surface.

X3. A further aspect of the present invention pertains to a method for removing gold colloid from nanoparticles, the method comprising combining a gold source, a sulfide source, and an adsorptive surface, and separating the adsorptive surface from the gold source and from the sulfide source after a predetermined time period, wherein the gold source and the sulfide source self-assemble into nanoparticles and gold colloid, and wherein one of the gold colloid and the nanoparticles is selectively adsorbed to the adsorptive surface.

Yet other embodiments pertain to any of the previous statements X1, X2 or X3 which are combined with one or more of the following other aspects.

Wherein the nanoparticles comprise gold and gold sulfide.

Wherein the gold source is a gold salt.

Wherein the gold source is chloroauric acid, sodium tetrachloroaureate(III) dehydrate, or a mixture thereof.

Wherein the sulfide source is a sulfide salt.

Wherein the sulfide source is one of sodium thiosulfate, sodium sulfide, or a mixture thereof.

Wherein the nanoparticles have an absorbance peak between 700 nm and 1100 nm.

Wherein the nanoparticles have an absorbance peak in the NIR range.

Controlling an absorbance peak of the nanoparticles by adjusting a ratio of gold source and sulfide source.

Wherein the adsorptive surface has a surface area.

Wherein the gold source and sulfide source have a combined volume.

Controlling an absorbance peak of the nanoparticles by adjusting a ratio of the surface area to the combined volume.

Wherein the combining occurs at a temperature, and further comprising controlling an absorbance peak of the nanoparticles by adjusting the temperature.

Wherein the temperature is about room temperature.

Wherein the temperature is up to about 100° C.

Wherein the temperature is about 100° C.

Wherein the combining occurs for a period of time.

Controlling an absorbance peak of the nanoparticles by adjusting the period of time.

Wherein the adsorptive surface is configured to permit movement of nanoparticles and gold colloid throughout the chamber without requiring passage through the adsorptive surface.

Wherein the adsorptive surface is configured to permit mixing of gold source, sulfide source, nanoparticles and gold colloid.

Wherein the adsorptive surface is configured to permit mixing of nanoparticles and gold colloid.

Wherein the adsorptive surface is configured not to subdivide the chamber.

Wherein only one of the gold colloid and the nanoparticles is selectively adsorbed to the adsorptive surface.

Wherein the gold colloid is selectively adsorbed to the adsorptive surface.

Wherein the nanoparticles are selectively adsorbed to the adsorptive surface.

Wherein the adsorptive surface is a membrane.

Wherein the adsorptive surface is a semipermeable membrane.

Wherein the membrane is a cellulose acetate membrane.

Wherein the nanoparticles have a tunable absorbance peak.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A method for making nanoparticles, the method comprising:
    providing a chamber including an adsorptive surface; and
    combining a gold source and a sulfide source in the chamber;
    wherein the gold source and sulfide source self-assemble into nanoparticles and gold colloid, and wherein one of the gold colloid and the nanoparticles is selectively adsorbed to the adsorptive surface.

2. The method of claim 1, wherein the nanoparticles comprise gold and gold sulfide.

3. The method of claim 1, wherein the gold source is a gold salt.

4. The method of claim 3, wherein the gold source is chloroauric acid, sodium tetrachloroaureate(III) dehydrate, or a mixture thereof.

5. The method of claim 1, wherein the sulfide source is a sulfide salt.

6. The method of claim 5, wherein the sulfide source is one of sodium thiosulfate, sodium sulfide, or a mixture thereof.

7. The method of claim 1, wherein the nanoparticles have an absorbance peak between 700 nm and 1100 nm.

8. The method of claim 1, further comprising controlling an absorbance peak of the nanoparticles by adjusting a ratio of gold source and sulfide source.

9. The method of claim 1, wherein the adsorptive surface has a surface area and wherein the gold source and sulfide source have a combined volume, and further comprising controlling an absorbance peak of the nanoparticles by adjusting a ratio of the surface area to the combined volume.

10. The method of claim 1, wherein the combining occurs at a temperature, and further comprising controlling an absorbance peak of the nanoparticles by adjusting the temperature.

11. The method of claim 1, wherein the combining occurs for a period of time, and further comprising controlling an absorbance peak of the nanoparticles by adjusting the period of time.

12. The method of claim 1, wherein the gold colloid is selectively adsorbed to the adsorptive surface.

13. The method of claim 1, wherein the adsorptive surface is configured to permit movement of nanoparticles and gold colloid throughout the chamber without requiring passage through the adsorptive surface.

14. The method of claim 1, wherein the adsorptive surface is configured to permit mixing of gold source, sulfide source, nanoparticles and gold colloid.

15. The method of claim 1, wherein the adsorptive surface is a membrane.

16. The method of claim 15, wherein the membrane is a cellulose acetate membrane.

17. A method for self-assembly of nanoparticles, the method comprising:
    providing a solution including a gold source and a sulfide source;
    providing an adsorptive surface; and
    placing the solution and the adsorptive surface in a chamber;
    wherein the gold source and the sulfide source self-assemble into nanoparticles and gold colloid, and
    wherein the gold colloid is selectively adsorbed to the adsorptive surface.

18. The method of claim 17, wherein the nanoparticles have a tunable absorbance peak.

19. The method of claim 17, wherein the adsorptive surface is configured within the chamber to permit mixing of gold source, sulfide source, nanoparticles and gold colloid.

20. A method for removing gold colloid from nanoparticles, the method comprising:
    combining a gold source, a sulfide source, and an adsorptive surface; and
    separating the adsorptive surface from the gold source and from the sulfide source after a predetermined time period;
    wherein the gold source and the sulfide source self-assemble into nanoparticles and gold colloid, and
    wherein one of the gold colloid and the nanoparticles is selectively adsorbed to the adsorptive surface.

21. The method of claim 20, wherein the adsorptive surface is a cellulose acetate membrane.

* * * * *